US 8,410,794 B2
Nakayama et al.
Apr. 2, 2013

(54) OPERATOR IDENTIFYING APPARATUS, OPERATOR IDENTIFYING METHOD AND VEHICLE-MOUNTED APPARATUS

(75) Inventors: Tasuku Nakayama, Tokyo (JP); Craig A. Cordeiro, Westford, MA (US); Bernard O. Geaghan, Salem, NH (US)

(73) Assignee: 3M Innovative Properties Company, Saint Paul, MN (US)

( * ) Notice: Subject to any disclaimer, the term of this patent is extended or adjusted under 35 U.S.C. 154(b) by 257 days.

(21) Appl. No.: 12/995,371

(22) PCT Filed: Jun. 2, 2009

(86) PCT No.: PCT/US2009/045942
§ 371 (c)(1),
(2), (4) Date: Nov. 30, 2010

(87) PCT Pub. No.: WO2009/158152
PCT Pub. Date: Dec. 30, 2009

(65) Prior Publication Data
US 2011/0084707 A1     Apr. 14, 2011

(30) Foreign Application Priority Data

Jun. 25, 2008   (JP) ................. 2008-166508

(51) Int. Cl.
*G01R 27/26* (2006.01)
*G06F 3/041* (2006.01)
*G06F 7/00* (2006.01)

(52) U.S. Cl. ............ 324/658; 701/36; 701/45; 345/173

(58) Field of Classification Search ............... None
See application file for complete search history.

(56) References Cited

U.S. PATENT DOCUMENTS

| | | |
|---|---|---|
| 4,071,691 A | 1/1978 | Pepper, Jr. |
| 4,198,539 A | 4/1980 | Pepper, Jr. |
| 4,293,734 A | 10/1981 | Pepper, Jr. |
| 4,371,746 A | 2/1983 | Pepper, Jr. |
| 4,686,332 A | 8/1987 | Greanias et al. |
| 4,707,845 A | 11/1987 | Krein et al. |
| 5,153,572 A | 10/1992 | Caldwell et al. |
| 5,365,461 A | 11/1994 | Stein et al. |
| 5,402,151 A | 3/1995 | Duwaer |
| 5,484,967 A | 1/1996 | Yanagisawa et al. |
| 5,589,856 A | 12/1996 | Stein et al. |
| 5,648,642 A | 7/1997 | Miller |
| 5,815,141 A | 9/1998 | Phares |
| 5,943,043 A | 8/1999 | Furuhata et al. |
| 6,118,435 A | 9/2000 | Fujita et al. |
| 6,163,313 A | 12/2000 | Aroyan et al. |

(Continued)

FOREIGN PATENT DOCUMENTS

| | | |
|---|---|---|
| CN | 11-24390 | 6/1996 |
| EP | 0 414 566 A2 | 2/1991 |

(Continued)

OTHER PUBLICATIONS

Mitsubishi Electric Research Labs, "Group Touch", Technology Review, Jan./Feb. 2202, p. 16.

(Continued)

*Primary Examiner* — Jeff Natalini

(57) ABSTRACT

An operator identifying apparatus, operator identifying method, and a vehicle-mounted apparatus.

20 Claims, 16 Drawing Sheets

U.S. PATENT DOCUMENTS

| | | | |
|---|---|---|---|
| 6,225,985 B1 | 5/2001 | Armstrong et al. | |
| 6,236,391 B1 | 5/2001 | Kent et al. | |
| 6,246,395 B1 | 6/2001 | Goyins et al. | |
| 6,255,604 B1 | 7/2001 | Tokioka et al. | |
| 6,400,359 B1 | 6/2002 | Katabami | |
| 6,498,590 B1 | 12/2002 | Dietz et al. | |
| 6,650,345 B1 | 11/2003 | Saito | |
| 7,239,947 B2 * | 7/2007 | Suzuki | 701/36 |
| 7,453,444 B2 | 11/2008 | Geaghan | |
| 7,567,222 B2 * | 7/2009 | Tanaka et al. | 345/7 |
| 2002/0149571 A1 | 10/2002 | Roberts | |
| 2004/0158374 A1 | 8/2004 | Suzuki | |
| 2008/0004769 A1 * | 1/2008 | Lenneman et al. | 701/36 |
| 2009/0225036 A1 * | 9/2009 | Wright | 345/173 |
| 2011/0115717 A1 * | 5/2011 | Hable et al. | 345/173 |

FOREIGN PATENT DOCUMENTS

| | | |
|---|---|---|
| GB | 2 332 524 | 6/1999 |
| JP | 01-269120 | 10/1989 |
| JP | 07-103778 | 4/1995 |
| JP | 08-083144 | 3/1996 |
| JP | 08-190453 | 7/1996 |
| JP | 08-241161 | 9/1996 |
| JP | 9-109802 | 4/1997 |
| JP | 09-292261 | 11/1997 |
| JP | 09-292952 | 11/1997 |
| JP | 09-325851 | 12/1997 |
| JP | 11-248466 | 9/1999 |
| JP | 11-312053 | 11/1999 |
| JP | 2000-010733 | 1/2000 |
| JP | 2000-031809 | 1/2000 |
| JP | 2000-076014 | 3/2000 |
| JP | 2000-148396 | 5/2000 |
| JP | 2000-329577 | 11/2000 |
| JP | 2005-199973 | 7/2005 |
| JP | 2005178471 | 7/2005 |
| JP | 2006-193140 | 7/2006 |
| JP | 2006-279751 | 12/2006 |
| JP | 2007-103778 | 4/2007 |
| JP | 2007176323 | 7/2007 |
| JP | 2008120211 | 5/2008 |

OTHER PUBLICATIONS

IntelliTouch/SecureTouch/iTouch Surface Wave Touchscreens, *A Technical Comparison with Other Technologies*, ELO TouchSytems, Inc., 1999-2001 [from internet on Oct. 1, 2001], URL www.elotouch.com/products/inteltec/inteltecm.asp.

Itouch Surface Wave Technology, "Touch-on-Tube" *Technology—A Breakthrough for Gaming and Amusement Machines*, ELO TouchSystems, Inc., Sep. 2001.

\* cited by examiner

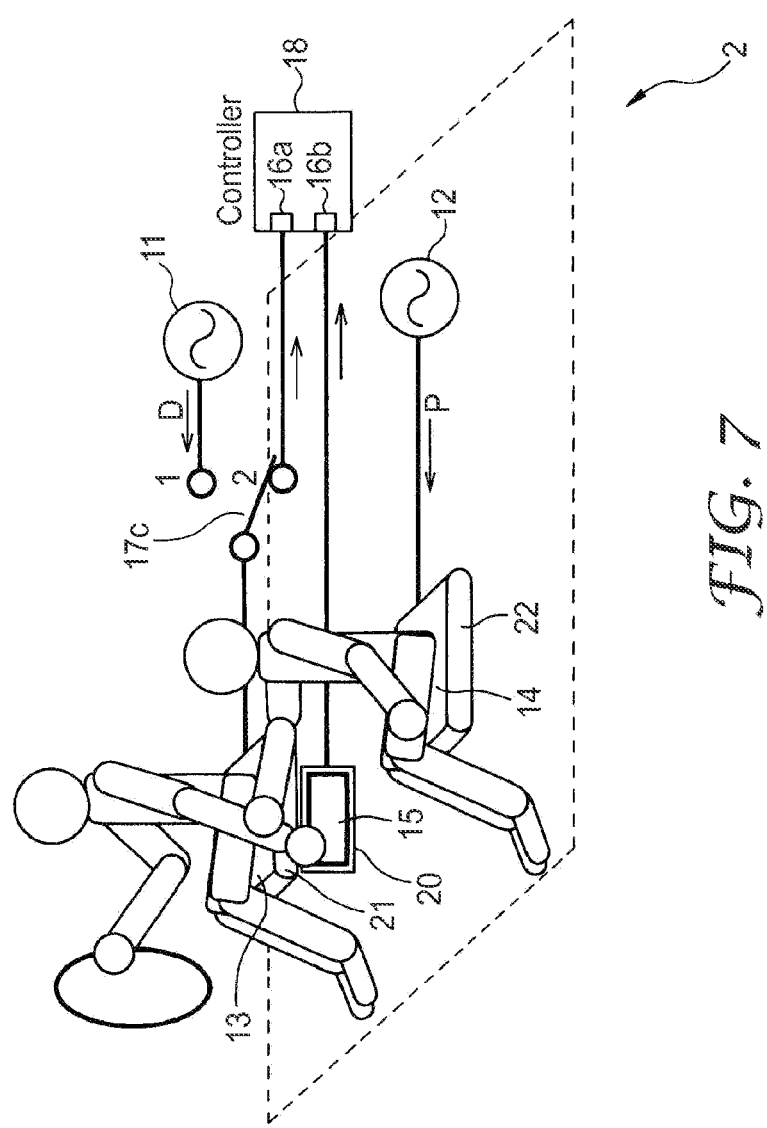

OPERATOR IDENTIFYING APPARATUS, OPERATOR IDENTIFYING METHOD AND VEHICLE-MOUNTED APPARATUS

CROSS REFERENCE TO RELATED APPLICATIONS

This application is a national stage filing under 35 U.S.C. 371 of PCT/US2009/158152, filed Jun. 2, 2009, which claims priority to Japanese Patent Application No. 2008-166508, filed Jun. 25, 2008, the disclosure of which is incorporated by reference in its/their entirety herein.

TECHNICAL FIELD

The present invention relates to an operator identifying apparatus, an operator identifying method, and a vehicle-mounted apparatus.

BACKGROUND

In recent years, to enhance safety during vehicle driving, apparatuses have been developed that prohibit the vehicle driver from operating a vehicle-mounted apparatus such as a navigation system, audio system, etc. when the vehicle is moving. However, while prohibiting the driver from operating such vehicle-mounted apparatus, it is desirable from the standpoint of convenience to allow the passenger to operate the vehicle-mounted apparatus.

SUMMARY

There can occur cases where the passenger operates the vehicle-mounted apparatus while in physical contact with the driver. Further, there can also occur cases where the driver and the passenger simultaneously touch the operation unit of the vehicle-mounted apparatus. In such cases also, it is desirable to prohibit the driver from operating the vehicle-mounted apparatus while driving.

Accordingly, it is an object of the present invention to provide an operator identifying apparatus and operator identifying method wherein provisions are made so that a person prohibited from operating a given apparatus can be duly prohibited from operating the apparatus or so that any operator involved in the operation of the apparatus can be identified; it is also an object of the invention to provide a vehicle-mounted apparatus that uses such an identifying apparatus and identifying method.

According to one aspect of the present invention, there is provided an operator identifying apparatus for identifying an operator that has operated an apparatus having an operation unit. The operator identifying apparatus comprises: a first oscillator for outputting a first identifying signal; a first electrode connected to the first oscillator and disposed so as to be able to transfer the first identifying signal to a first operator; a second oscillator for outputting a second identifying signal that has a signal characteristic different from the first identifying signal; a detector array including at least one detector for detecting the first identifying signal or the second identifying signal; a second electrode for transferring the second identifying signal to a second operator during a first period that the first oscillator is outputting the first identifying signal and the second oscillator is outputting the second identifying signal, and for transferring the first identifying signal, when coupled to the second operator via the first operator, to the detector array during a second period that the first oscillator is outputting the first identifying signal but that is different from the first period; a third electrode, disposed on the operation unit, for transferring the first identifying signal or the second identifying signal to the detector array when the first operator or the second operator touches the operation unit; and, a controller connected to the detector array. When the detector array detected the first identifying signal during the first period but did not detect the first identifying signal during the second period, the controller determines that the first operator has operated the operation unit, and when the detector array detected the first identifying signal during the second period, the controller determines that both of the first operator and the second operator are involved in the operation of the apparatus.

According to another aspect of the present invention, there is provided an operator identifying apparatus for identifying an operator that has operated an apparatus having an operation unit. The operator identifying apparatus comprises: an oscillator array, including at least one oscillator, for outputting a first identifying signal during a first period and for outputting a second identifying signal during a second period that is different from the first period; a first electrode disposed so as to be able to transfer the first identifying signal to a first operator; a second electrode disposed so as to be able to transfer the second identifying signal to a second operator; a first detector for detecting the first identifying signal or the second identifying signal; a third electrode, disposed on the operation unit and connected to the first detector, for transferring the first identifying signal or the second identifying signal to the first detector when the first operator or the second operator touches the operation unit; a second detector for detecting the second identifying signal passed through the second operator and the first operator during the second period; and, a controller connected to the first and second detectors. When the first detector detected the first identifying signal during the first period, and when neither the first detector nor the second detector detected the second identifying signal during the second period, the operator determines that the first operator has operated the operation unit, and when the second detector detected the second identifying signal during the second period, the controller determines that both of the first operator and the second operator are involved in the operation of the apparatus.

According to still another aspect of the present invention, there is provided an operator identifying apparatus for identifying an operator that has operated an apparatus having an operation unit. The operator identifying apparatus comprises: a first oscillator for outputting a first identifying signal oscillating with a prescribed frequency; a first electrode connected to the first oscillator and disposed so as to be able to transfer the first identifying signal to a first operator; a second oscillator for outputting a second identifying signal that is identical in frequency and amplitude to the first identifying signal but is inverted in phase with respect to the first identifying signal; a second electrode connected to the second oscillator and disposed so as to be able to transfer the second identifying signal to a second operator; a detector for detecting the first identifying signal or the second identifying signal; a third electrode, disposed on the operation unit and connected to the detector, for transferring the first identifying signal or the second identifying signal to the detector when the first operator or the second operator touches the operation unit; and, a controller connected to the detector. When the detector detected the first identifying signal, the controller determines that the first operator has operated the operation unit, and when the detector detected neither the first identifying signal nor the second identifying signal, the controller determines that both of the first operator and the second operator are involved in the operation of the apparatus.

According to still another aspect of the present invention, there is provided an operator identifying method for identifying an operator that has operated an apparatus having an operation unit. The operator identifying method comprises the steps of: in a first period, supplying a first identifying signal produced by a first oscillator to a first electrode disposed so as to be able to transfer the first identifying signal to a first operator, and supplying a second identifying signal produced by a second oscillator and having a characteristic different from the first identifying signal to a second electrode disposed so as to be able to transfer the second identifying signal to a second operator; in the first period, detecting by the detector the first identifying signal or the second identifying signal transferred thereto via a third electrode disposed on the operation unit when the operation unit is touched by the first operator or the second operator; in a second period different from the first period, supplying the first identifying signal from the first oscillator to the first electrode, and detecting by the detector the first identifying signal transferred thereto by passing through the first operator and the second operator; determining that both of the first operator and the second operator are involved in the operation of the apparatus when the detector detected the first identifying signal during the second period; and, determining that the first operator has operated the operation unit when the detector did not detect the first identifying signal during the second period but detected the first identifying signal during the first period.

According to still another aspect of the present invention, there is provided an operator identifying method for identifying an operator that has operated an apparatus having an operation unit. The operator identifying method comprises the steps of: in a first period, supplying a first identifying signal produced by an oscillator array including at least one oscillator to a first electrode disposed so as to be able to transfer the first identifying signal to a first operator; in the first period, detecting by a first detector connected to a third electrode disposed on the operation unit the first identifying signal transferred thereto when the operation unit is touched by the first operator; in a second period different from the first period, supplying a second identifying signal produced by the oscillator array to a second electrode disposed so as to be able to transfer the second identifying signal to a second operator; in the second period, detecting by the first detector the second identifying signal transferred thereto when the operation unit is touched by the second operator; in the second period, detecting by a second detector the second identifying signal that has passed through the first and second operators; determining that the first operator has operated the operation unit when the first detector detected the first identifying signal during the first period and when neither the first detector nor the second detector detected the second identifying signal during the second period; and, determining that both of the first operator and the second operator are involved in the operation of the apparatus when the second detector detected the second identifying signal during the second period.

According to still another aspect of the present invention, there is provided an operator identifying method for identifying an operator that has operated an apparatus having an operation unit. The operator identifying method comprises the steps of: supplying a first identifying signal produced by a first oscillator oscillating with a prescribed frequency to a first electrode disposed so as to be able to transfer the first identifying signal to a first operator, and supplying a second identifying signal produced by a second oscillator, identical in frequency and amplitude to the first identifying signal but inverted in phase with respect to the first identifying signal, to a second electrode disposed so as to be able to transfer the second identifying signal to a second operator; detecting by a detector connected to a third electrode disposed on the operation unit the first identifying signal or the second identifying signal transferred thereto when the operation unit is touched by the first operator or the second operator; determining that the first operator has operated the operation unit when the detector detected the first identifying signal; and, determining that both of the first operator and the second operator are involved in the operation of the apparatus when the detector detected neither the first identifying signal nor the second identifying signal.

According to a further aspect of the present invention, there is provided a vehicle-mounted apparatus. The vehicle-mounted apparatus comprises: any one of the operator identifying apparatus described above; an operation unit; and, a control unit for performing processing in response to an operation that a first operator or a second operator has performed via the operation unit. When the operation unit is operated during vehicle driving, if a signal indicating that the first operator has performed the operation unit or a signal indicating that both of the first operator and the second operator are involved in the operation, the control unit disables the operation.

According to a still further aspect of the present invention, there is provided a navigation system mounted in a vehicle. The navigation system comprises: a position detection unit for detecting current position of the vehicle; map storage unit for storing road map information; an operation unit; a route determining unit for determining a route from the current position of the vehicle to a destination, based on destination information entered via the operation unit and on the current position of the vehicle detected by the position detection unit and the road map information stored in the map storage unit; a display unit for displaying the route; a first oscillator for outputting a first identifying signal; a first electrode connected to the first oscillator and disposed so as to be able to transfer the first identifying signal to a vehicle driver; a second oscillator for outputting a second identifying signal that has a signal characteristic different from the first identifying signal; a detector array including at least one detector for detecting the first identifying signal or the second identifying signal; a second electrode for transferring the second identifying signal to a passenger during a first period that the first oscillator is outputting the first identifying signal and the second oscillator is outputting the second identifying signal, and for transferring the first identifying signal, when coupled to the passenger via the vehicle driver, to the detector array during a second period that the first oscillator is outputting the first identifying signal but that is different from the first period; a third electrode, disposed on the operation unit, for transferring the first identifying signal or the second identifying signal to the detector array when the vehicle driver or the passenger touches the operation unit; and, a controller connected to the detector array. The controller includes: an operator identifying unit for determining that the vehicle driver has operated the operation unit when the detector array detected the first identifying signal during the first period but did not detect the first identifying signal during the second period, and for determining that both of the vehicle driver and the passenger are involved in the operation when the detector array detected the first identifying signal during the second period; and a control unit for disabling any operation performed on the operation unit if a signal indicating that the vehicle driver has operated the operation unit or a signal

BRIEF DESCRIPTION OF THE DRAWINGS

FIG. 7 is a diagram schematically showing the configuration of an operator identifying apparatus according to a second embodiment of the present invention.

DETAILED DESCRIPTION

The present invention can provide an operator identifying apparatus and operator identifying method by making provisions so that a person prohibited from operating a given apparatus can be duly prohibited from operating the apparatus or so that any operator involved in the operation of the apparatus can be identified, and a vehicle-mounted apparatus that uses such an identifying apparatus and identifying method.

Embodiments of the present invention will be described below with reference to the drawings.

An operator identifying apparatus according to a first embodiment of the present invention is mounted, for example, in a vehicle, and identifies the person that has operated a vehicle-mounted apparatus, such as a navigation system, that can be operated by any occupant of the vehicle. For this purpose, the operator identifying apparatus outputs separate identifying signals to the driver seat and the passenger seat. The identifying signal to the driver seat is inverted in phase with respect to the identifying signal to the passenger seat. In the operation of the operator identifying apparatus, when an occupant touches the operation unit of the vehicle-mounted apparatus, the identifying signal that flowed through the occupant touching the operation unit and through an electrode provided on the operation unit is detected by a detector synchronized to the generation of the identifying signal, thereby determining whether the identifying signal is one that flowed through the driver or through the passenger. If the identifying signal to the driver seat is detected that has passed through both the driver and the passenger, the operator identifying apparatus determines that both of the driver and the passenger are involved in the operation.

Figure 1:
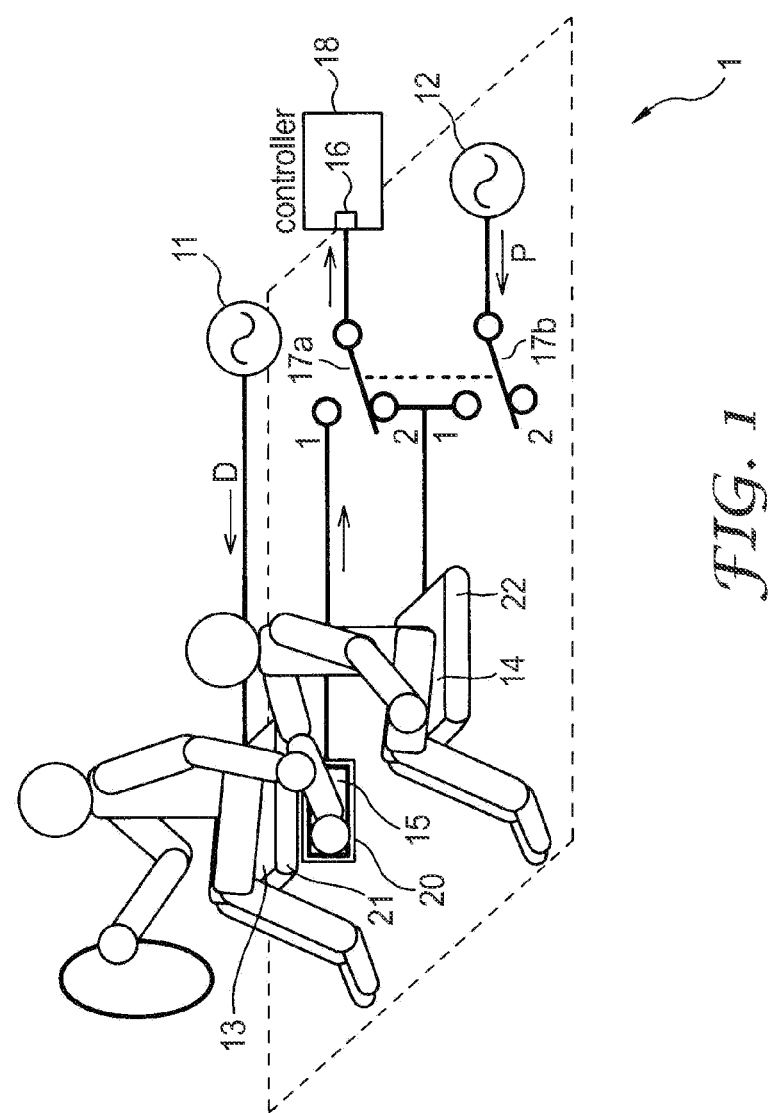
FIG. 1 is a diagram schematically showing the configuration of an operator identifying apparatus according to a first embodiment of the present invention.

FIG. 1 is a diagram schematically showing the configuration of the operator identifying apparatus 1 according to the first embodiment of the present invention. As shown in FIG. 1, the operator identifying apparatus 1 comprises two oscillators 11 and 12, two seat electrodes 13 and 14, an electrode 15, a detector 16, switches 17a and 17b, and a controller 18.

The oscillator 11 is electrically connected to the seat electrode 13 mounted in the driver seat 21, and supplies a driver identifying signal D to the seat electrode 13. The driver identifying signal D is a signal wave oscillating with a prescribed frequency, and may be generated, for example, in the form of a rectangular wave, a sine wave, or a sawtooth wave. The prescribed frequency is set equal to such a frequency that a plurality of signal waves are output during the period that the driver keeps touching the operation unit 20 of the vehicle-mounted apparatus when he or she operates the vehicle-mounted apparatus once, for example, to 1 kHz or 2 kHz. On the other hand, the oscillator 12 is electrically connectable via the switch 17b to the seat electrode 14 mounted in the passenger seat 22. The oscillator 12 generates a passenger identifying signal P. The passenger identifying signal P is a signal wave substantially identical in waveform, frequency, and amplitude to the driver identifying signal D, but inverted in phase with respect to the driver identifying signal D. Both the driver identifying signal D and the passenger identifying signal P are very weak signals that do not affect humans if they are passed through the human body.

The oscillators 11 and 12 are controlled by the controller 18 to operate in synchronism with each other, and start to output the driver identifying signal D and the passenger identifying signal P at the same time. Here, the transmission start timing may be made different between the driver identifying signal D and the passenger identifying signal P. Since the oscillators 11 and 12 can be constructed from various known oscillator circuits, the details of their configuration will not be described here.

The electrode 15 is formed, for example, from a transparent conductive film, and is provided on the operation unit 20, for example, a touch panel or the like, of the vehicle-mounted apparatus whose operator is to be identified. The electrode 15 is electrically connectable to the detector 16 via the switch 17a. Here, when the operation unit 20 of the vehicle-mounted apparatus includes a conductive film for detecting an operation, such as a resistive-film type touch panel, the conductive film may be used as the electrode 15. On the other and, when the operation unit 20 of the vehicle-mounted apparatus is a capacitive type touch panel, the electrode 15 may be formed from a conductive film and an electrode disposed at the periphery of the touch panel and configured to detect a capacitance change on the panel surface. If the operation unit 20 of the vehicle-mounted apparatus does not have such a conductive film, as in the case of an operation button, the electrode 15 may be formed from an opaque electrode such as a metal plate and be disposed on the surface of the operation unit 20. When the electrode 15 is formed from a component, etc. of a capacitive type touch panel, as described above, the touch panel may be a touch panel capable of simultaneous multipoint detection in which no electrical conduction occurs between persons touching the panel simultaneously. Further, the operation unit 20 may be constructed from a switch that has an electrode within a housing formed from an insulating material and that detects an operation by utilizing capacitive coupling occurring between the operator and the electrode.

The switch 17a electrically connects either the electrode 15 or the seat electrode 14, whichever is selected, to the detector 16. On the other hand, the switch 17b electrically connects and disconnects the oscillator 12 to and from the seat electrode 14. The operations of the switches 17a and 17b are synchronized under the control of the controller 18.

More specifically, when the switch 17a is set to connect the electrode 15 to the detector 16, the switch 17b is set to connect the seat electrode 14 to the oscillator 12. This state is hereinafter called the first state. In the first state, the passenger identifying signal P generated by the oscillator 12 is supplied to the seat electrode 14. On the other hand, the signal applied to the electrode 15 is transferred to the detector 16. In this situation, if the driver seated in the driver seat 21 touches the operation unit 20 to operate the vehicle-mounted apparatus, the driver identifying signal D output from the oscillator 11 flows to the detector 16 by passing through the seat electrode 13, the driver, and the electrode 15. If the passenger seated in the passenger seat 22 touches the operation unit 20 of the vehicle-mounted apparatus, the passenger identifying signal P output from the oscillator 12 flows to the detector 16 by passing through the seat electrode 14, the passenger, and the electrode 15.

On the other hand, when the switch 17a is set to connect the seat electrode 14 to the detector 16, the switch 17b is set to disconnect the seat electrode 14 from the oscillator 12. This state is hereinafter called the second state. In the second state, if the driver and the passenger are in physical contact with each other, the driver identifying signal D output from the oscillator 11 flows to the detector 16 by passing through the seat electrode 13, the driver, the passenger, and the seat electrode 14.

The detector 16 detects the driver identifying signal D transferred via the seat electrode 14 or via the electrode 15 or the passenger identifying signal P transferred via the electrode 15. In the present embodiment, the detector 16 includes a voltmeter. When the driver operates the operation unit 20 of the vehicle-mounted apparatus, the detector 16 measures the voltage of the signal output from the electrode 15 in the circuit formed by the oscillator 11, the seat electrode 13, the driver, and the electrode 15 (or the passenger and the seat electrode 14). When the passenger operates the operation unit 20 of the vehicle-mounted apparatus, the detector 16 measures the voltage of the signal output from the electrode 15 in the circuit formed by the oscillator 12, the seat electrode 14, the passenger, and the electrode 15. Alternatively, the detector 16 may include an ammeter. In this case, the detector 16 measures the value of the current that flows in the closed circuit formed when the driver or the passenger touches the operation unit 20 of the vehicle-mounted apparatus or when the driver and the passenger are in physical contact with each other.

The detector 16 transmits the result of the measurement of the signal waveform (for example, the maximum and minimum values of the measured voltage) to the controller 18.

The controller 18 includes a built-in control unit, a semiconductor memory such as a ROM, RAM, etc., and a communication interface and its peripheral circuitry. The controller 18 controls the oscillators 11 and 12, switches 17a and 17b, etc. Further, based on the result of the measurement of the signal waveform received from the detector 16, the controller 18 determines whether the person that operated the vehicle-mounted apparatus is the driver or the passenger. The controller 18 also checks whether or not both of the driver and the passenger are involved in the operation of the vehicle-mounted apparatus. Here, the sentence "both of the driver and the passenger are involved in the operation of the vehicle-mounted apparatus" refers not only to the situation where the driver or the passenger touches the operation unit 20 of the vehicle-mounted apparatus while the driver and the passenger are in physical contact with each other, but also to the situation where the driver and the passenger simultaneously touch the operation unit 20, regardless of whether they are in physical contact with each other.

Figure 2A:
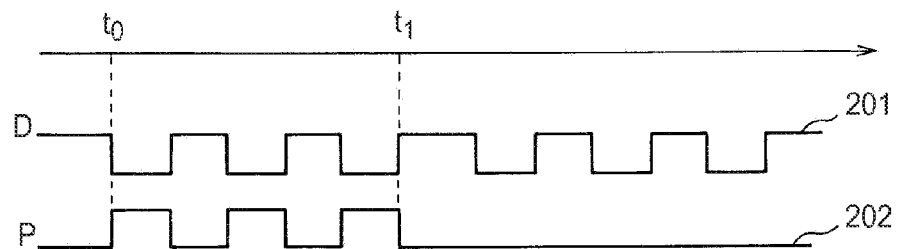
FIGS. 2a through 2e are timing charts of identifying signals output from oscillators and signals detected by a detector in the operator identifying apparatus according to the first embodiment of the present invention.
Figure 2B:
Figure 2C:
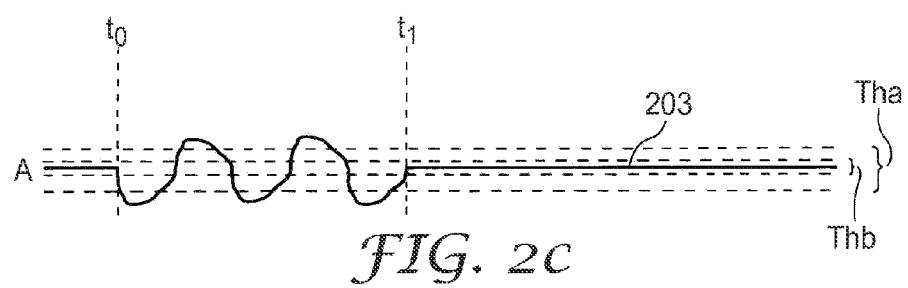
Figure 2D:
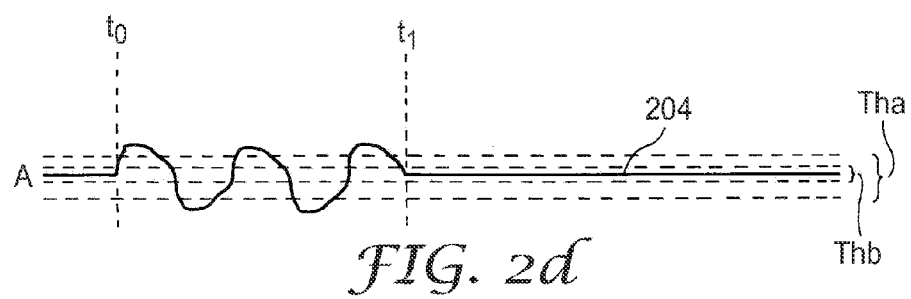
Figure 2E:
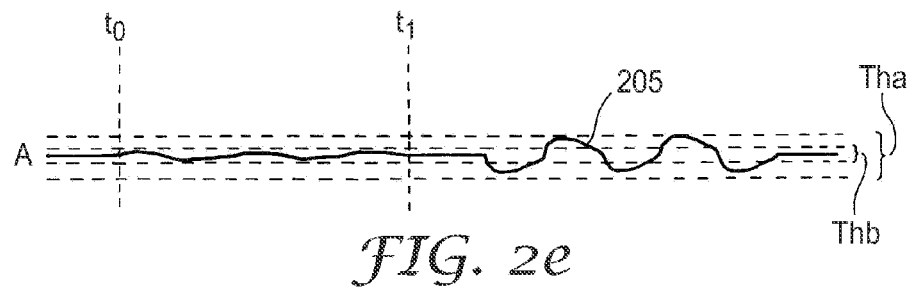

The operator identifying process performed by the controller 18 will be described with reference to the timing charts shown in FIGS. 2(a) to 2(e). FIG. 2(a) shows the signal waveform 201 of the driver identifying signal D and the signal waveform 202 of the passenger identifying signal P. FIG. 2(b) shows the set states of the switches 17a and 17b. FIG. 2(c) shows the waveform 203 that the detector 16 detects when the driver touches the operation unit 20 of the vehicle-mounted apparatus. FIG. 2(d) shows the waveform 204 that the detector 16 detects when the passenger touches the operation unit 20 of the vehicle-mounted apparatus. Further, FIG. 2(e) shows the waveform 205 that the detector 16 detects when the driver or the passenger touches the operation unit 20 of the vehicle-mounted apparatus while the driver and the passenger are in physical contact with each other. In FIGS. 2(a) to 2(e), the abscissa represents the elapsed time. In FIGS. 2(a) and 2(c) to 2(e), the ordinate represents the voltage, and A indicates the reference voltage. The difference between the maximum or minimum value of the voltage measured by the detector 16 and the reference voltage A represents the maximum amplitude of the signal detected by the detector 16. The numeric value "1" shown in FIG. 2(b) indicates that the switches 17a and 17b are in the first state, and the numeric value "2" indicates that the switches 17a and 17b are in the second state.

When a signal indicating that some kind of operation has been performed using the operation unit 20 on the vehicle-mounted apparatus whose operator is to be identified is received via a communication network that performs communications in accordance with an automotive communication standard such as the control area network (CAN), the controller 18 initiates the process for identifying the operator. The time at which the process is initiated is designated as time $t_0$. At time $t_0$, the controller 18 sets the switches 17a and 17b to the first state. That is, the switch 17a is set to connect the electrode 15 to the detector 16, and the switch 17b is set to connect the seat electrode 14 to the oscillator 12. Further, at time $t_0$, the controller 18 causes the oscillator 11 to output the driver identifying signal D and the oscillator 12 to output the passenger identifying signal P.

In this first state, if the driver seated in the driver seat 21 touches the operation unit 20 to operate the vehicle-mounted apparatus, the driver identifying signal D output from the oscillator 11 flows to the detector 16 by passing through the seat electrode 13, the driver, and the electrode 15. As a result, as shown in FIG. 2(c), the detector 16 can detect a relatively large amplitude signal oscillating with the same period as the driver identifying signal D. On the other hand, if the passenger seated in the passenger seat 22 touches the operation unit 20 of the vehicle-mounted apparatus, the passenger identifying signal P output from the oscillator 12 flows to the detector 16 by passing through the seat electrode 14, the passenger, and the electrode 15. As a result, as shown in FIG. 2(d), the detector 16 can detect a relatively large amplitude signal oscillating with the same period as the passenger identifying signal P.

Further, in the first state, if the driver or the passenger touches the operation unit 20 of the vehicle-mounted apparatus while the driver and the passenger are in physical contact with each other, the driver identifying signal D and the passenger identifying signal P both flow to the detector 16 by passing through the driver and the passenger. This also happens when the driver and the passenger simultaneously touch the operation unit 20 of the vehicle-mounted apparatus. In this embodiment, the driver identifying signal D and the passenger identifying signal P are substantially identical in frequency and amplitude but inverted in phase with respect to each other. As a result, the driver identifying signal D and the passenger identifying signal P cancel each other out. Accordingly, as shown in FIG. 2(e), if the degree of attenuation of the driver identifying signal D and that of the passenger identifying signal P are substantially the same, the amplitude of the signal detected by the detector 16 becomes small.

Next, at time $t_1$ after a predetermined time has elapsed, the controller 18 changes the switches 17a and 17b to the second state. That is, the switch 17a is set to connect the seat electrode 14 to the detector 16, and the switch 17b is set to disconnect the seat electrode 14 from the oscillator 12. Further, at time $t_1$, the controller 18 causes the oscillator 12 to stop outputting the passenger identifying signal P, while allowing the oscillator 11 to continue to output the driver identifying signal D. Here, since the oscillator 12 is disconnected from the seat electrode 14 by the switch 17b, and the passenger identifying signal P is not supplied anywhere after time $t_1$, the oscillator 12 may be allowed to continue to output the passenger identifying signal P after time $t_1$.

In this second state, when the driver and the passenger are in physical contact with each other, or when the driver and the passenger simultaneously touch the operation unit 20 and electrical conduction occurs between the drive and passenger through the electrode 15, the detector 16 can detect the driver identifying signal D output from the oscillator 11 and passed through the driver, the passenger, and the seat electrode 14, as shown in FIG. 2(e). On the other hand, as shown in FIGS. 2(c) and 2(d), when the driver and the passenger are not in physical contact with each other, the detector 16 detects neither signal because neither the oscillator 11 nor the oscillator 12 is electrically connected to the seat electrode 14 to which the detector 16 is connected.

Further, when the electrode 15 is of the type that does not cause electrical conduction between the driver and the passenger, such as a touch panel capable of simultaneous multi-point detection, if the driver and the passenger simultaneously touch the operation unit 20 in the second state, the detector 16 detects neither signal. Accordingly, the controller 18 can discriminate between the case where the driver and the passenger have performed the operation simultaneously and the case where the driver and the passenger are in physical contact with each other.

Next, the operation procedure by which the controller 18 carries out the operator identifying process will be described below with reference to the flowchart shown in FIG. 3.

First, when the vehicle-mounted apparatus detects its operation unit 20 being operated and instructs the operator identifying apparatus 1 to initiate the operator identifying process, the controller 18 sets the switches 17a and 17b to the first state. That is, the controller 18 sets the switch 17a to connect the electrode 15 to the detector 16 and the switch 17b to connect the seat electrode 14 to the oscillator 12 (step S301). Next, in the first period during which the switches 17a and 17b are held in the first state, the controller 18 causes the oscillator 11 to output the driver identifying signal D to the seat electrode 13. The controller 18 also causes the oscillator 12 to output the passenger identifying signal P to the seat electrode 14 (step S302). Next, in the first period, the controller 18 checks whether the absolute value of the maximum amplitude of the signal detected by the detector 16 exceeds a first threshold value $Th_a$ (step S303).

The first threshold value $Th_a$ is given, for example, by the following equation.

$$Th_a = V_{smaller} - V_m \quad (1)$$

Here, $V_{smaller}$ represents the voltage value corresponding to the amplitude of the signal detected by the detector 16 when the driver identifying signal D is transferred to the detector 16 by passing only through the driver or the voltage value corresponding to the amplitude of the signal detected by the detector 16 when the passenger identifying signal P is transferred to the detector 16 by passing only through the passenger, whichever value is smaller. $V_m$ is a margin value for preventing an erroneous detection. Alternatively, the first threshold value $Th_a$ may be determined by multiplying $V_{smaller}$ by a prescribed constant smaller than 1 (for example, 0.9).

If the absolute value of the maximum amplitude is not larger than the threshold value $Th_a$ in step S303, the controller 18 determines that both of the driver and the passenger are involved in the operation (step S304). In this case, the controller 18 transmits to the vehicle-mounted apparatus an operator identifying signal indicating that both of the driver and the passenger are involved in the operation.

On the other hand, if the absolute value of the maximum amplitude of the detected signal is larger than the threshold value $Th_a$ in step S303, the controller 18 checks whether the signal detected by the detector 16 is the driver identifying signal D or the passenger identifying signal P (step S305).

Here, if the amplitude of the signal detected by the detector 16 during the positive swing of the driver identifying signal D (that is, when the voltage value of the driver identifying signal D is the highest) is larger than the threshold value $Th_a$, as shown in FIG. 2(c), the detected signal can be considered to have the same phase as the driver identifying signal D. Accordingly, in this case, the controller 18 determines that the driver identifying signal D has been detected. Likewise, if the amplitude of the signal detected by the detector 16 during the negative swing of the driver identifying signal D (that is, when the voltage value of the driver identifying signal D is the lowest) is smaller than the threshold value $-Th_a$, the controller 18 may determine that the driver identifying signal D has been detected. Further, the controller 18 may compare the detected signal with the threshold value $Th_a$ a plurality of times during the first period in order to prevent an erroneous detection due to noise, etc. For example, if the amplitude of the detected signal exceeding the threshold value $Th_a$ during the positive swing of the driver identifying signal D, or the amplitude of the detected signal exceeding the threshold value $-Th_a$ during the negative swing of the driver identifying signal D, has been detected a plurality of times during the first period, the controller 18 may determine that the driver identifying signal D has been detected.

On the other hand, if the amplitude of the signal detected by the detector 16 during the positive swing of the passenger identifying signal P (that is, when the voltage value of the passenger identifying signal P is the highest) is larger than the threshold value $Th_a$, as shown in FIG. 2(d), the detected signal can be considered to have the same phase as the passenger identifying signal P. Accordingly, when the amplitude of the signal detected during the positive swing of the passenger identifying signal P is larger than the threshold value $Th_a$, the controller 18 determines that the passenger identifying signal P has been detected. Likewise, if the amplitude of the signal detected by the detector 16 during the negative swing of the passenger identifying signal P is smaller than the threshold value $-Th_a$, the controller 18 may determine that the passenger identifying signal P has been detected. Here, since the passenger identifying signal P is inverted in phase with respect to the driver identifying signal D, it is clear that there is no possibility of the detector 16 detecting both the identifying signals simultaneously swinging in the positive direction or in the negative direction.

The controller 18 temporarily stores the result of the determination in the memory of the controller 18.

Next, the controller 18 sets the switches 17a and 17b to the second state to initiate the second period. That is, after the first period has elapsed, the controller 18 sets the switch 17a to connect the seat electrode 14 to the detector 16 and the switch 17b to disconnect the seat electrode 14 from the oscillator 12. Further, the controller 18 causes the oscillator 12 to stop outputting the passenger identifying signal P, while allowing the oscillator 11 to continue to output the driver identifying signal D (step S306). Thereafter, in the second period, the controller 18 checks whether the absolute value of the maximum amplitude of the signal detected by the detector 16 exceeds a second threshold value $Th_b$ (step S307). The second threshold value $Th_b$ is suitably set based on the result of an experiment or simulation to match the conditions under which the operator identifying apparatus 1 is installed. In the second period, the detector 16 is connected to the seat electrode 14 mounted in the passenger seat 22, and only the driver identifying signal D is supplied. As a result, the signal is detected at the detector 16 only when the driver and the passenger are in physical contact with each other, or when the driver and the passenger are in an electrically conductible condition through the electrode 15 and when the driver and the passenger simultaneously touch the operation unit 20. Accordingly, if the absolute value of the maximum amplitude of the detected signal is larger than the second threshold value $Th_b$ in step S307, the controller 18 determines that the driver identifying signal D has been detected. That is, the controller 18 determines that both of the driver and the passenger are involved in the operation (step S308).

On the other hand, if the absolute value of the maximum amplitude of the signal detected during the second period is not larger than the second threshold value $Th_b$ in step S308, the controller 18 refers to the memory and checks whether the signal detected in the first period and determined in step S305 is the driver identifying signal D or not (step S309). If the signal detected in the first period and determined in step S309 was the driver identifying signal D, the controller 18 determines that the driver has operated the operation unit 20 (step S310). On the other hand, if the signal detected in the first period and determined in step S309 was the passenger identifying signal P, the controller 18 determines that the passenger has operated the operation unit 20 (step S311).

After terminating the above process, the controller 18 sends an operator identifying signal indicating the result of the operator identification to the vehicle-mounted apparatus.

Each time the vehicle-mounted apparatus is operated, the controller 18 checks whether the operator is the driver or the passenger and whether both of the driver and the passenger are involved in the operation. For this purpose, the first and second periods are set sufficiently shorter than the period that the driver or the passenger keeps touching the operation unit 20 of the vehicle-mounted apparatus when he or she operates the vehicle-mounted apparatus once. Further, the first and second periods are set sufficiently longer than the period of the driver identifying signal D or the passenger identifying signal P in order to accurately detect the maximum amplitude of the identifying signal detected by the detector 16. For example, the first and second periods are each set to 10 msec. The lengths of the first and second periods may be set different. Further, in the first period, the length of the period during which the driver identifying signal D is output and the length of the period during which the passenger identifying signal P is output may be set different. Further, the controller 18 may control the oscillators 11 and 12 and the switches 17a and 17b so that the first and second periods are alternately repeated a plurality of times. Furthermore, the controller 18 may control the oscillators 11 and 12 and the switches 17a and 17b so that the second period precedes the first period.

As described above, in the operator identifying apparatus 1 according to the first embodiment of the present invention, since the passenger identifying signal P is inverted in phase with respect to the driver identifying signal D, and since the signal detected by the detector 16 is examined to see whether its phase matches the phase of the driver identifying signal D or the passenger identifying signal P, it can be accurately determined which occupant, the driver or the passenger, has operated the vehicle-mounted apparatus. Further, in the operator identifying apparatus 1, an off period during which the passenger identifying signal is not supplied to the seat electrode 12 is provided, and the driver identifying signal D passing through both the driver and the passenger is measured during the off period, to determine whether both of the driver and the passenger are involved in the operation.

If the driver is seated in the seat by placing a cushion thereon, for example, the driver identifying signal D passed through the driver may be attenuated to a greater degree than the passenger identifying signal P passed through the passenger. In this situation, if the driver touches the operation unit 20 of the vehicle-mounted apparatus while the driver and the passenger are in physical contact with each other, the driver identifying signal D attenuated to a greater degree than the passenger identifying signal P is transferred to the detector 16. As a result, a signal oscillating with the same period and having the same phase as the passenger identifying signal P, not the driver identifying signal D, is detected by the detector 16. However, since the operator identifying apparatus 1 according to the first embodiment of the present invention can determine whether the driver and the passenger are in physical contact with each other based on the detected signal in the second period, erroneous identification of the operator of the vehicle-mounted apparatus can be prevented. Further, since the area of coupling between the electrode 14 and the passenger is much larger than the area of coupling between the electrode 15 and the driver, the attenuation of the signal transferred to the detector 16 via the electrode 14 is smaller than that of the signal transferred to the detector 16 via the electrode 15. Accordingly, in this case also, the detector 16 can detect the identifying signal with good sensitivity in the second period.

Figure 4:
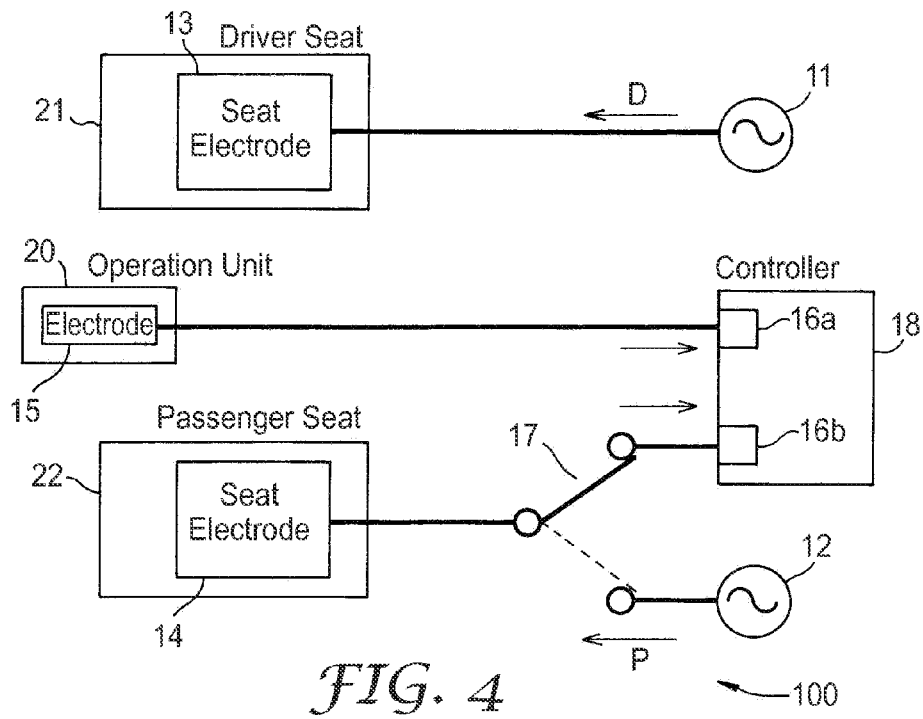
FIG. 4 is a diagram schematically showing the configuration of an operator identifying apparatus according to a modified example of the first embodiment.

FIG. 4 shows schematically the configuration of an operator identifying apparatus 100 according to a modified example of the first embodiment. As shown in FIG. 4, the operator identifying apparatus 100 differs from the operator identifying apparatus 1 of the first embodiment in that the switches 17a and 17b are replaced by a single switch 17 and in that two detectors 16a and 16b are provided. In FIG. 4, the component elements identical in construction and function to those in the operator identifying apparatus 1 are designated by the same reference numerals as those designating the corresponding component elements in the operator identifying apparatus 1. The operator identifying apparatus 100 will be describe below by dealing only with the differences from the operator identifying apparatus 1.

The electrode 15 provided on the operation unit 20 of the vehicle-mounted apparatus is electrically connected to the detector 16a. The switch 17 is controlled by the controller 18 and is set to electrically connect the seat electrode 14 mounted in the passenger seat 22 to the oscillator 12 in the first period and to the detector 16b in the second period.

In the operator identifying apparatus 100, as in the operator identifying apparatus 1, in the first period the oscillator outputs the driver identifying signal D and the oscillator 12 outputs the passenger identifying signal P. The driver identifying signal D and the passenger identifying signal P are substantially identical in amplitude and frequency but inverted in phase with respect to each other. In the second period, the oscillator outputs the driver identifying signal D.

Accordingly, in the first period, the detector 16a can detect the driver identifying signal D passed through the driver and the electrode 15, as with the detector 16 in the operator identifying apparatus 1. Similarly, the detector 16a can detect the passenger identifying signal P passed through the passenger and the electrode 15.

On the other hand, in the second period, if the driver and the passenger is in physical contact with each other, the detector 16b can detect the driver identifying signal D passed through the driver and the passenger. When the driver and the passenger are in an electrically conductible condition through the electrode 15, and when the driver and the passenger simultaneously touch the operation unit 20, the detector 16b can likewise detect the driver identifying signal D passed through the driver and the passenger.

Figure 3:
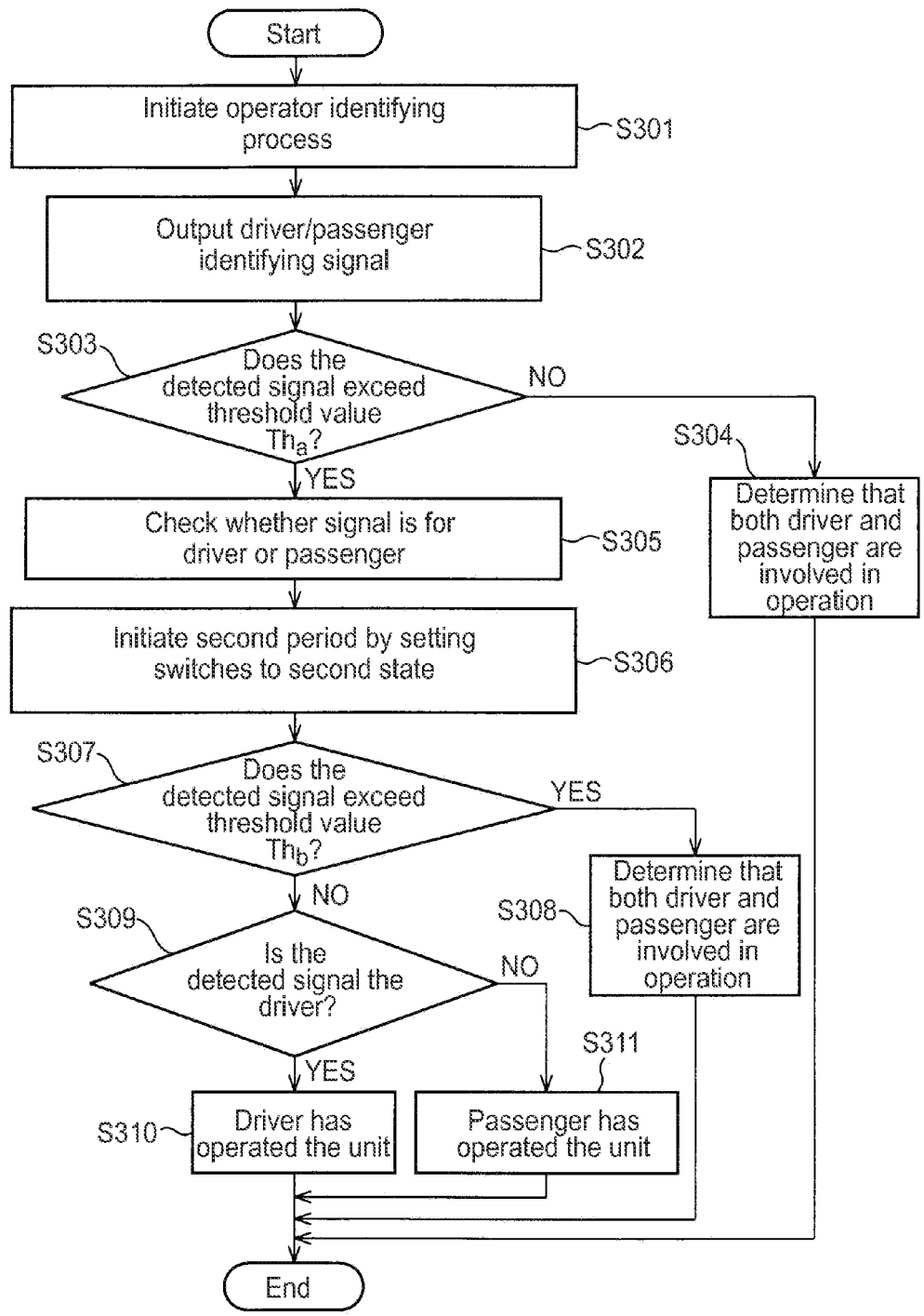
FIG. 3 is a flowchart showing a procedure for an operator identifying process performed by the operator identifying apparatus according to the first embodiment of the present invention.

Accordingly, by examining the signal detected by the detector 16a in the first period, and by examining the signal detected by the detector 16b in the second period, the operator identifying apparatus 100 can identify the operator of the vehicle-mounted apparatus and determine whether both of the driver and the passenger are involved in the operation, by the same procedure as the operation procedure shown in FIG. 3.

A further modified example of the first embodiment will be described with reference to FIG. 5.

Figure 5:
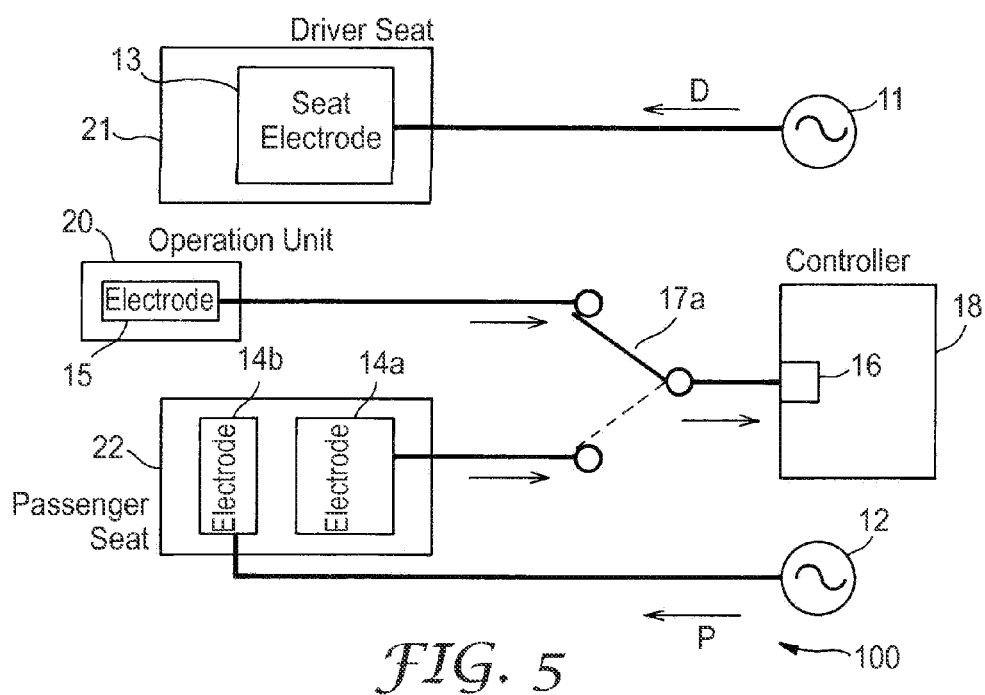
FIG. 5 is a diagram schematically showing the configuration of an operator identifying apparatus according to a further modified example of the first embodiment.

FIG. 5 shows schematically the configuration of an operator identifying apparatus 110 according to the further modified example of the first embodiment. The operator identifying apparatus 110 differs from the operator identifying apparatus 1 in that the switch 17b is omitted and in that the seat electrode 14 is divided into two electrically insulated seat electrodes 14a and 14b. In FIG. 5, the component elements identical in construction and function to those in the operator identifying apparatus 1 are designated by the same reference numerals as those designating the corresponding component elements in the operator identifying apparatus 1. The operator identifying apparatus 110 will be describe below by dealing only with the differences from the operator identifying apparatus 1.

In the operator identifying apparatus 110, the seat electrode 14a is electrically connected to the detector 16 via the switch 17a. The seat electrode 14b is electrically connected to the oscillator 12. The switch 17a is set to connect the electrode 15 to the detector in the first period and to connect the seat electrode 14a to the detector 16 in the second period.

Accordingly, in the first period, the detector 16 can detect the driver identifying signal D passed through the driver and the electrode 15, as in the operator identifying apparatus 1. Similarly, the detector 16 can detect the passenger identifying signal P passed through the seat electrode 14b, the passenger, and the electrode 15.

On the other hand, in the second period, if the driver and the passenger is in physical contact with each other, the detector 16 can detect the driver identifying signal D passed through the driver, the passenger, and the seat electrode 14a. When the driver and the passenger are in an electrically conductible condition through the electrode 15, and when the driver and the passenger simultaneously touch the operation unit 20, the detector 16 can likewise detect the driver identifying signal D passed through the driver, the electrode 15, the passenger, and the seat electrode 14a.

Accordingly, the operator identifying apparatus 110 can identify the operator of the vehicle-mounted apparatus and determine whether both of the driver and the passenger are involved in the operation, in accordance with the same procedure as the operation procedure shown in FIG. 3.

A still further modified example of the first embodiment will be described with reference to FIG. 6.

Figure 6:
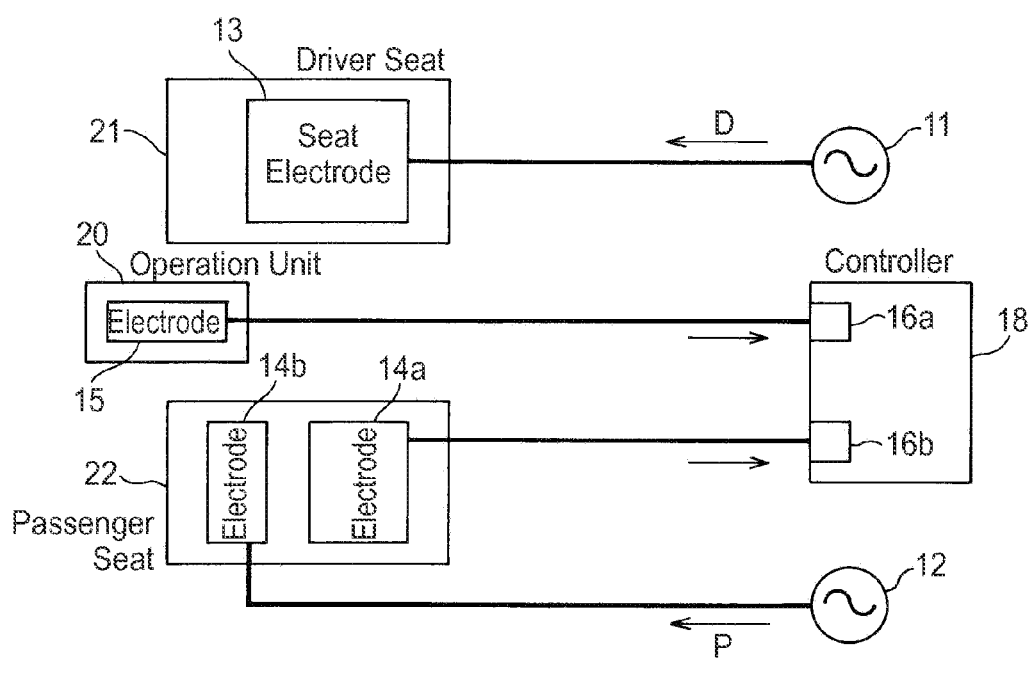
FIG. 6 is a diagram schematically showing the configuration of an operator identifying apparatus according to a still further modified example of the first embodiment.

FIG. 6 shows schematically the configuration of an operator identifying apparatus 120 according to the still further modified example of the first embodiment. The operator identifying apparatus 120 differs from the operator identifying apparatus 1 in that the switches 17a and 17b are omitted, in that the seat electrode 14 is divided into two electrically insulated seat electrodes 14a and 14b, and in that two detectors 16a and 16b are provided. In FIG. 6, the component elements identical in construction and function to those in the operator identifying apparatus 1 are designated by the same reference numerals as those designating the corresponding component elements in the operator identifying apparatus 1. The operator identifying apparatus 120 will be describe below by dealing only with the differences from the operator identifying apparatus 1.

In the operator identifying apparatus 120, the electrode 15 provided on the operation unit 20 of the vehicle-mounted apparatus is electrically connected to the detector 16a. The seat electrode 14a is electrically connected to the detector 16b. The seat electrode 14b is electrically connected to the oscillator 12.

Accordingly, in the first period, the detector 16a can detect the driver identifying signal D passed through the driver and the electrode 15, as with the detector 16 in the operator identifying apparatus 1. Similarly, the detector 16a can detect the passenger identifying signal P passed through the seat electrode 14b, the passenger, and the electrode 15.

On the other hand, in the second period, if the driver and the passenger is in physical contact with each other, the detector 16b can detect the driver identifying signal D passed through the driver, the passenger, and the seat electrode 14a. When the driver and the passenger are in an electrically conductible condition through the electrode 15, and when the driver and the passenger simultaneously touch the operation unit 20, the detector 16b can likewise detect the driver identifying signal D passed through the driver, the electrode 15, the passenger, and the seat electrode 14a.

Accordingly, by examining the signal detected by the detector 16a in the first period, and by examining the signal detected by the detector 16b in the second period, the operator identifying apparatus 120 can identify the operator of the vehicle-mounted apparatus and determine whether both of the driver and the passenger are involved in the operation, by the same procedure as the operation procedure shown in FIG. 3. In this way, since the operator identifying apparatus 120 can identify the operator of the vehicle-mounted apparatus without using moving parts such as switches, high tolerance to faults can be achieved.

In the first embodiment or in any one of its modified examples, a period during which only the driver identifying signal D or the passenger identifying signal P is output may be provided within the first period. This arrangement serves to prevent either identifying signal from becoming unable to be detected because of the other identifying signal when there is a large difference in maximum amplitude between the identifying signals detected by the detector 16. Examples includes an arrangement in which, in the first period, the oscillator 11 starts to produce the driver identifying signal D and, with a predetermined time delay thereafter, the oscillator 12 starts to produce the passenger identifying signal P, and the oscillator 12 stops producing the passenger identifying signal P when a predetermined time has elapsed after the oscillator 11 stopped producing the driver identifying signal D.

In the first embodiment or in any one of its modified examples, the frequency of the passenger identifying signal P to be produced by the oscillator 12 may be set different from the frequency of the driver identifying signal D. For example, the frequency of the driver identifying signal D is set to f1 (for example, 1.1 kHz), while the frequency of the passenger identifying signal P is set to f2 (for example, 1.5 kHz). Suppose here that the amplitude of the signal detected by the detector 16 has been detected as exceeding the threshold value $Th_a$ a plurality of times during the first period. In this case, if the frequency of the detection is equal to the frequency f1, the signal detected by the detector 16 can be considered to have the same frequency f1 as the driver identifying signal D. Accordingly, in this case, the controller 18 can determine that the driver identifying signal D has been detected. On the other hand, if the frequency of the detection is equal to the frequency f2, the signal detected by the detector 16 can be considered to have the same frequency f2 as the passenger identifying signal P. Accordingly, in this case, the controller 18 can determine that the passenger identifying signal P has been detected. Further, regarding the determination as to whether both of the driver and the passenger are involved in the operation, the controller 18 can determine that the driver and the passenger are in physical contact with each other when a signal amplitude exceeding the threshold value $Th_b$ is detected during the second period, as earlier described. When the frequency of the driver identifying signal D is set different from the frequency of the passenger identifying signal P, if there is no need to check whether both of the driver and the passenger are involved in the operation, the contact determination in the second period may be omitted.

Further, instead of or in addition to inverting the phase of the driver identifying signal D with respect to the phase of the passenger identifying signal P, the amplitude of the driver identifying signal D may be made different from the amplitude of the passenger identifying signal P in order to determine whether the person that operated the vehicle-mounted apparatus is the driver or the passenger. In this case, the threshold value $Th_a$ is replaced by a threshold value $Th_{aD}$ for detecting the driver identifying signal D and a threshold value $Th_{aP}$ for detecting the passenger identifying signal P. For example, when the amplitude of the driver identifying signal D is made larger the amplitude of the passenger identifying signal P, the threshold value $Th_{aD}$ is set larger than the value of the amplitude of the passenger identifying signal P, while the threshold value $Th_{aP}$ is set smaller than the value of the amplitude of the passenger identifying signal P. Then, in the first period, if the maximum value of the amplitude of the signal detected by the detector 16 exceeds the threshold value $Th_{aD}$, the controller 18 determines that the driver identifying signal D has been detected. On the other hand, in the first period, if the maximum value of the amplitude of the signal detected by the detector 16 is smaller than the threshold value $Th_{aD}$ but larger than the threshold value $Th_{aP}$, the controller 18 determines that the passenger identifying signal P has been detected.

Alternatively, the waveform of the driver identifying signal D may be made different from that of the passenger identifying signal P. In this case, the controller 18 determines whether the waveform of the signal detected by the detector 16 is closer to that of the driver identifying signal D or to that of the passenger identifying signal P. Based on the result of this determination, the controller 18 can determine whether the detected signal is the driver identifying signal D or the passenger identifying signal P.

In this way, by making the characteristic of the driver identifying signal D different from the characteristic of the passenger identifying signal P, it becomes possible for the controller 18 to determine whether the signal detected by the detector 16 is the driver identifying signal D or the passenger identifying signal P.

Further, in the first embodiment, the driver seat 21 and the passenger seat 22 may be interchanged so that the seat electrode 13 is mounted in the passenger seat 22 and the seat electrode 14 in the driver seat 21. In this case, if the detector 16 detects the signal output from the oscillator 11 during the first period, as previously described, the controller 18 can determine that the passenger has operated the vehicle-mounted apparatus. On the other hand, if the detector 16 detects the signal output from the oscillator 12 during the first period, the controller 18 can determine that the driver has operated the vehicle-mounted apparatus. Here, the controller 18 can determine whether both of the driver and the passenger are involved in the operation in the same manner as previously described.

Next, an operator identifying apparatus according to a second embodiment of the present invention will be described.

The operator identifying apparatus according to the second embodiment of the present invention outputs different identifying signals to the driver seat and the passenger seat, respectively, at different times. Further, the operator identifying apparatus has two detectors. In the operation of the operator identifying apparatus, when an occupant touches the electrode provided on the operation unit of the vehicle-mounted apparatus, the identifying signal that flowed through the occupant touching the electrode and through the electrode is detected by one of the detectors, to identify the occupant that has operated the vehicle-mounted apparatus. Further, by checking whether the identifying signal passing through both the driver and the passenger is detected by the other detector, a determination is made as to whether both of the driver and the passenger are involved in the operation of the vehicle-mounted apparatus. As in the first embodiment, the sentence "both of the driver and the passenger are involved in the operation of the vehicle-mounted apparatus" refers not only to the situation where the driver or the passenger touches the operation unit of the vehicle-mounted apparatus while the driver and the passenger are in physical contact with each other, but also to the situation where the driver and the passenger simultaneously touch the operation unit, regardless of whether they are in physical contact with each other.

FIG. 7 is a diagram schematically showing the configuration of the operator identifying apparatus 2 according to the second embodiment of the present invention. As shown in FIG. 7, the operator identifying apparatus 2 comprises two oscillators 11 and 12, two seat electrodes 13 and 14, an electrode 15, two detectors 16a and 16b, a switch 17c, and a controller 18. In FIG. 4, the component elements identical in construction and function to those in the operator identifying apparatus of the first embodiment are designated by the same reference numerals as those designating the corresponding component elements in the operator identifying apparatus of the first embodiment. The operator identifying apparatus 2 according to the second embodiment will be describe below by dealing only with the differences from the operator identifying apparatus 1 of the first embodiment.

The oscillator 11 is electrically connectable via the switch 17c to the seat electrode 13 mounted in the driver seat 21. The oscillator 11 generates a driver identifying signal D. On the other hand, the oscillator 12 is electrically connected to the seat electrode 14 mounted in the passenger seat 22. The oscillator 12 generates a passenger identifying signal P. The passenger identifying signal P may be generated as a signal wave substantially identical in waveform, frequency, and amplitude to the driver identifying signal D. Alternatively, the passenger identifying signal P may be generated to have a different waveform, frequency, or amplitude than the driver identifying signal D.

The oscillators 11 and 12 are controlled by the controller 18. During the period that the oscillator 11 is outputting the driver identifying signal D, the oscillator 12 does not output the passenger identifying signal P. Conversely, during the period that the oscillator 12 is outputting the passenger identifying signal P, the oscillator 11 does not output the driver identifying signal D.

The electrode 15 is electrically connected to the detector 16a. When the driver touches the electrode 15, the driver identifying signal D output from the oscillator 11 is transferred via the electrode 15 to the detector 16a. On the other hand, when the passenger touches the electrode 15, the passenger identifying signal P output from the oscillator 12 is transferred via the electrode 15 to the detector 16a.

The switch 17c is controlled by the controller 18 and electrically connects the seat electrode 13 to either the oscillator 11 or the detector 16b.

The detector 16a detects the driver identifying signal D or the passenger identifying signal P transferred thereto via the electrode 15. More specifically, when the driver operates the operation unit 20 of the vehicle-mounted apparatus, the detector 16a measures the voltage of the signal output from the electrode 15 in the circuit formed by the oscillator 11, the seat electrode 13, the driver, and the electrode 15. When the passenger operates the operation unit 20 of the vehicle-mounted apparatus, the detector 16a measures the voltage of the signal output from the electrode 15 in the circuit formed by the oscillator 12, the seat electrode 14, the passenger, and the electrode 15. Alternatively, like the detector 16 in the operator identifying apparatus 1 of the first embodiment, the detector 16a may be configured to measure the value of the current that flows in the closed circuit formed when the driver or the passenger touches the operation unit 20 of the vehicle-mounted apparatus or when the driver and the passenger are in physical contact with each other.

On the other hand, the detector 16b detects the passenger identifying signal P output from the oscillator 12 and passed through the seat electrode 14, the passenger, the driver, and the seat electrode 13 when the driver and the passenger are in physical contact with each other.

The detectors 16a and 16b each transmit the result of the measurement of the signal waveform (for example, the maximum and minimum values of the measured voltage) to the controller 18.

The controller 18 controls the oscillators 11 and 12, switch 17c, etc. Further, based on the result of the measurement of the signal waveform received from each of the detectors 16a and 16b, the controller 18 determines whether the person that operated the vehicle-mounted apparatus is the driver or the passenger. The controller 18 also checks whether or not the driver and the passenger are in physical contact with each other.

Figure 8A:
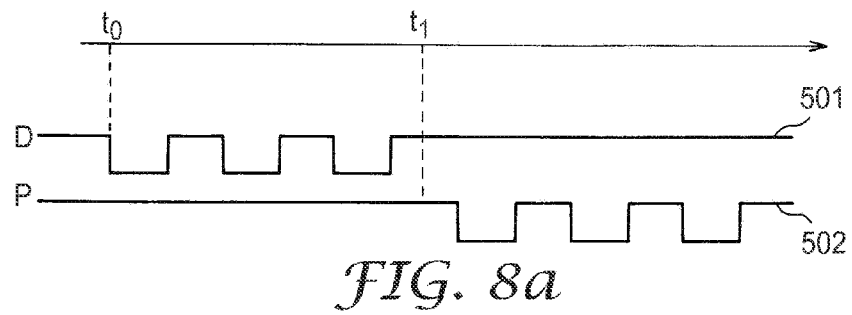
FIGS. 8a through 8e are timing charts of identifying signals output from oscillators and signals detected by detectors in the operator identifying apparatus according to the second embodiment of the present invention.
Figure 8B:
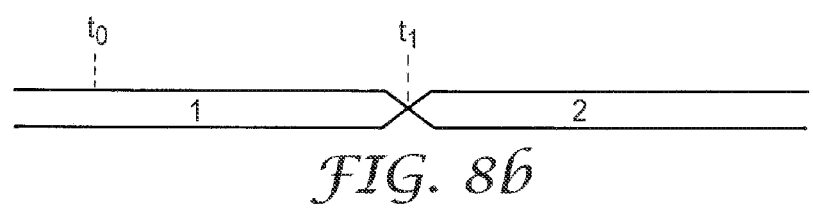
Figure 8C:
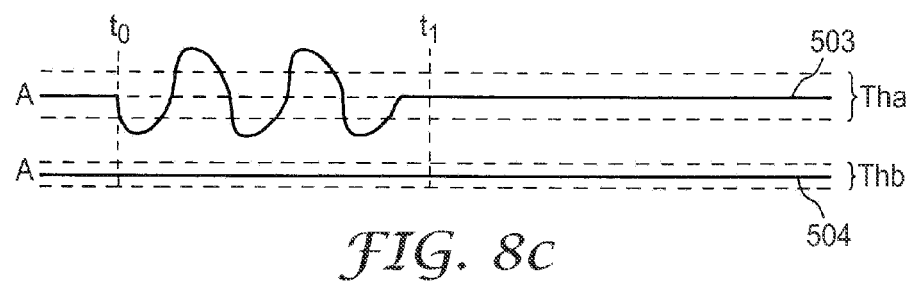
Figure 8D:
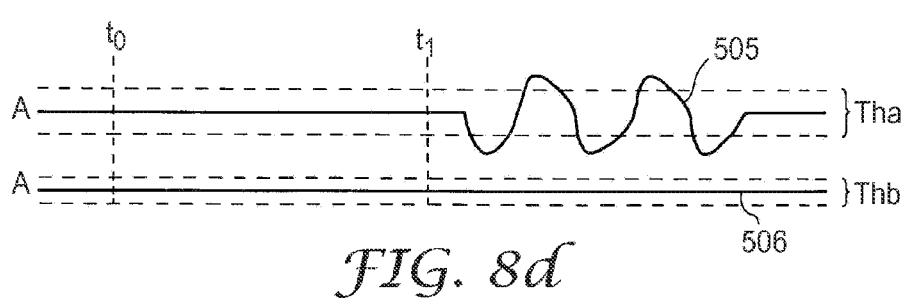
Figure 8E:
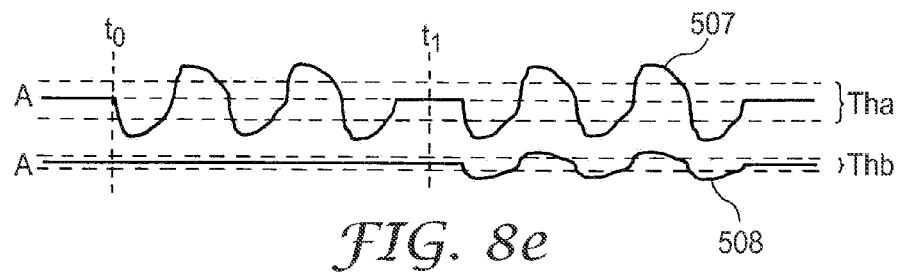

The operator identifying process that the controller 18 performs to identify the operator of the vehicle-mounted apparatus will be described with reference to the timing charts shown in FIGS. 8(a) to 8(e). FIG. 8(a) shows the signal waveform 501 of the driver identifying signal D and the signal waveform 502 of the passenger identifying signal P. FIG. 8(b) shows the set state of the switch 17c. FIG. 8(c) shows the waveforms 503 and 504 that the detectors 16a and 16b respectively detect when the driver touches the operation unit 20 of the vehicle-mounted apparatus. FIG. 8(d) shows the waveforms 505 and 506 that the detectors 16a and 16b respectively detect when the passenger touches the operation unit 20 of the vehicle-mounted apparatus. Further, FIG. 8(e) shows the waveforms 507 and 508 that the detectors 16a and 16b respectively detect when the driver or the passenger touches the operation unit 20 of the vehicle-mounted apparatus while the driver and the passenger are in physical contact with each other. In FIGS. 8(a) to 8(e), the abscissa represents the elapsed time. In FIGS. 8(a) and 8(c) to 8(e), the ordinate represents the voltage, and A indicates the reference voltage. The difference between the maximum or minimum value of the voltage measured by the detector 16a or 16b and the reference voltage A represents the maximum amplitude of the signal detected by the detector 16. The numeric value "1" shown in FIG. 8(b) indicates that the switch 17c is in a first state to connect the seat electrode 13 to the oscillator 11, and the numeric value "2" indicates that the switch 17c is in a second state to connect the seat electrode 13 to the detector 16b.

At time $t_0$, the controller 18 initiates the operator identifying process of the vehicle-mounted apparatus. At this time, the controller 18 sets the switch 17c to the first state. Further, at time $t_0$, the controller 18 allows only the oscillator 11 to operate and output the driver identifying signal D.

In the first period during which the switch 17c is held in the first state, if the driver seated in the driver seat 21 touches the operation unit 20 to operate the vehicle-mounted apparatus, the driver identifying signal D output from the oscillator 11 flows to the detector 16a by passing through the seat electrode 13, the driver, and the electrode 15. As a result, as shown in FIG. 8(c), the detector 16a can detect a relatively large amplitude signal oscillating with the same period as the driver identifying signal D.

On the other hand, in the first period, if the passenger seated in the passenger seat 22 touches the operation unit 20 of the vehicle-mounted apparatus without coming into physical contact with the driver, the detector 16 does not detect any identifying signal because the oscillator 12 is not operating.

Next, at time $t_1$ after a predetermined time has elapsed, the controller 18 changes the switch 17c to the second state. That is, the switch 17c is set to connect the seat electrode 13 to the detector 16b and disconnects the oscillator 11 from the seat electrode 13. Further, at time $t_1$, the controller 18 causes the oscillator 12 to start outputting the passenger identifying signal P, while causing the oscillator 11 to stop outputting the driver identifying signal D.

In the second period during which the switch 17c is held in the second state, if the passenger seated in the passenger seat 22 touches the operation unit 20 of the vehicle-mounted apparatus, the passenger identifying signal P output from the oscillator 12 flows to the detector 16a by passing through the seat electrode 14, the passenger, and the electrode 15. As a result, as shown in FIG. 8(d), the detector 16a can detect a relatively large amplitude signal oscillating with the same period as the passenger identifying signal P. Further, in the second period, if the driver and the passenger are in physical contact with each other, the passenger identifying signal P flows to the detector 16a via the electrode 15 when either the driver or the passenger touches the operation unit 20 of the vehicle-mounted apparatus. Accordingly, in this case also, the detector 16a detects a relatively large amplitude signal oscillating with the same period as the passenger identifying signal P.

In the second period, if the driver and the passenger are in physical contact with each other, the passenger identifying signal P is transferred to the detector 16b by passing through the seat electrode 14, the passenger, the driver, and the seat electrode 13. As a result, a relatively large amplitude signal oscillating with the same period as the passenger identifying signal P can also be detected at the detector 16b, as shown in FIG. 8(e). When the driver and the passenger are in an electrically conductible condition through the electrode 15, if the driver and the passenger simultaneously touch the electrode 15, the result of the detection by the detector 16b is the same as when the driver and the passenger are in physical contact with each other.

Further, there are cases where electrical conduction does not occur between the driver and the passenger through the electrode 15, as in the case where the electrode 15 is constructed from a touch panel capable of simultaneous multipoint detection. In such cases, if the driver or the passenger touches the operation unit 15 without coming into contact with each other, the detector 16b does not detect any signal in the first period or in the second period. On the other hand, the detector 16a detects in the first period a relatively large amplitude signal oscillating with the same period as the driver identifying signal D and, in the second period, a relatively large amplitude signal oscillating with the same period as the passenger identifying signal P.

Accordingly, in the first period, if the absolute value of the maximum amplitude of the identifying signal detected by the detector 16a is larger than the first threshold value $Th_a$, the controller 18 determines that the driver has touched the operation unit 20 of the vehicle-mounted apparatus. In the second period, if the absolute value of the maximum amplitude of the identifying signal detected by the detector 16a is larger than the first threshold value $Th_a$, but the absolute value of the maximum amplitude of the identifying signal detected by the detector 16b is not larger than the second threshold value $Th_b$, the controller 18 determines that the passenger has touched the operation unit 20 of the vehicle-mounted apparatus. On the other hand, in the second period, if the absolute value of the maximum amplitude of the identifying signal detected by the detector 16b is larger than the second threshold value $Th_b$, the controller 18 determines that both of the driver and the passenger are involved in the operation of the vehicle-mounted apparatus. The first and second threshold values $Th_a$ and $Th_b$ can be set to the same values as the first and second threshold values $Th_a$ and $Th_b$ used in the first embodiment.

If, in both of the first and second periods, the absolute value of the maximum amplitude of the identifying signal detected by the detector 16a is larger than the first threshold value $Th_a$, the controller 18 may also determine that both of the driver and the passenger are involved in the operation of the vehicle-mounted apparatus.

Next, the operation procedure by which the controller 18 carries out the operator identifying process will be described below with reference to the flowchart shown in FIG. 9.

First, when the vehicle-mounted apparatus detects its operation unit 20 being operated and instructs the operator identifying apparatus 2 to initiate the operator identifying process, the controller 18 sets the switch 17c to the first state. That is, the controller 18 sets the switch 17c to connect the seat electrode 13 to the oscillator 11 (step S601). Next, in the first period during which the switch 17c is held in the first state, the controller 18 causes the oscillator 11 to output the driver identifying signal D to the seat electrode 13 (step S602). Next, in the first period, the controller 18 checks whether the absolute value of the maximum amplitude of the signal detected by the detector 16a exceeds the threshold value $Th_a$ (step S603). If the absolute value of the maximum amplitude is not larger than the threshold value $Th_a$ in step S603, the controller 18 determines that the driver identifying signal D has not been detected (step S604). On the other hand, if the absolute value of the maximum amplitude of the detected signal is larger than the threshold value $Th_a$ in step S603, the controller 18 determines that the driver identifying signal D has been detected (step S605). The controller 18 temporarily stores the result of the determination in the memory of the controller 18.

After step S604 or S605, i.e., after the first period has elapsed, the controller 18 sets the switch 17c to the second state. That is, the controller 18 sets the switch 17c to connect the seat electrode 13 to the detector 16a and disconnect the seat electrode 13 from the oscillator 11 (step S606). Then, in the second period during which the switch 17c is held in the second state, the controller 18 causes the oscillator 12 to output the passenger identifying signal P to the seat electrode 14 (step S607). Thereafter, in the second period, the controller 18 checks whether the absolute value of the maximum amplitude of the signal detected by the detector 16b exceeds the threshold value $Th_b$ (step S608). During the second period, only the passenger identifying signal is supplied, and the detector 16b is connected to the seat electrode 13 mounted in the driver seat 21. As a result, the identifying signal can be detected by the detector 16b only when the driver and the passenger are in physical contact with each other. Accordingly, if the absolute value of the maximum amplitude of the detected signal is larger than the threshold value $Th_b$ in step S608, the controller 18 determines that the passenger identifying signal P has been detected. That is, the controller 18 determines that both of the driver and the passenger are involved in the operation of the vehicle-mounted apparatus (step S609).

On the other hand, if the absolute value of the maximum amplitude of the detected signal is not larger than the second threshold value $Th_b$ in step S608, then the controller 18 checks whether the absolute value of the maximum amplitude of the signal detected by the detector 16a during the second period is larger than the threshold value $Th_a$ (step S610). If the absolute value of the maximum amplitude is not larger than the threshold value $Th_a$ in step S610, the controller 18 checks the result of the determination stored in step S605 to see whether the driver identifying signal D has been detected during the first period (step S611). If the driver identifying signal D has been detected during the first period, the controller 18 determines that the driver has operated the vehicle-mounted apparatus (step S612). If it is determined in step S611 that the driver identifying signal D has not been detected during the first period, the controller 18 determines that a third person who is neither the driver nor the passenger has operated the vehicle-mounted apparatus (step S613). On the other hand, if the absolute value of the maximum amplitude of the detected signal is larger than the threshold value $Th_a$ in step S610, the controller 18 determines that the passenger has operated the vehicle-mounted apparatus (step S614).

After terminating the above process, the controller 18 sends an operator identifying signal indicating the result of the operator identification to the vehicle-mounted apparatus.

The above operation procedure may be modified as shown below.

If the absolute value of the maximum amplitude of the signal detected by the detector 16a is larger than the threshold value $Th_a$ in step S610 (that is, the passenger identifying signal P is detected during the second period), the controller 18 checks the result of the determination stored in step S605 to see whether the driver identifying signal D has been detected during the first period. If the driver identifying signal D has been detected during the first period, the controller 18 determines that both of the driver and the passenger are involved in the operation of the vehicle-mounted apparatus. If the driver identifying signal D has not been detected during the first period, the controller 18 determines that the passenger has operated the vehicle-mounted apparatus. By identifying the operator as in this modified example, the controller 18 can detect that the driver or the passenger has touched the operation unit 15 without coming into contact with each other, even when no electrical conduction occurs between the driver and the passenger through the electrode 15.

Further, if the driver is seated in the seat by placing a cushion thereon, for example, the driver identifying signal D passed through the driver may be attenuated to a greater degree than the passenger identifying signal P passed through the passenger. In this situation, if the driver touches the operation unit 20 of the vehicle-mounted apparatus while the driver and the passenger are in physical contact with each other, the driver identifying signal D attenuated to a greater degree than the passenger identifying signal P is transferred to the detector 16. In this case, only the driver identifying signal D may drop to a level lower than the threshold value $Th_a$, leading to a situation where the driver identifying signal D is not detected by the detector 16a whereas the passenger identifying signal P is detected. However, since the operator identifying apparatus 2 according to the second embodiment of the present invention can determine whether the driver and the passenger are in physical contact with each other based on the signal detected by the detector 16b in the second period, erroneous identification of the operator of the vehicle-mounted apparatus can be prevented. Further, since the area of coupling between the electrode 14 and the passenger is much larger than the area of coupling between the electrode 15 and the driver, the attenuation of the signal transferred to the detector 16b via the electrode 14 is smaller than that of the signal transferred to the detector 16a via the electrode 15. Accordingly, the detector 16b can detect the identifying signal with good sensitivity.

As described above, by supplying the driver identifying signal and the passenger identifying signal alternately and by detecting the identifying signals by the detector 16a through the electrode provided on the operation unit 20 of the vehicle-mounted apparatus, the operator identifying apparatus 2 according to the second embodiment of the present invention can identify which occupant, the driver or the passenger, has operated the vehicle-mounted apparatus. Further, the operator identifying apparatus 2 can determine whether the driver and the passenger are in physical contact with each other, by checking whether the driver identifying signal passing through both the driver and the passenger has been detected during the output period of the passenger identifying signal P by the detector 16b provided separately from the detector 16a.

In the second embodiment, as in the operator identifying apparatus according to the first embodiment, the lengths of the first and second periods may be set different. Further, the controller 18 may control the oscillators 11 and 12 and the switch 17c so that the first and second periods are alternately repeated a plurality of times. Furthermore, the controller 18 may control the oscillators 11 and 12 and the switch 17c so that the second period precedes the first period.

Further, the operator identifying apparatus according to the second embodiment may include an additional detector for detecting the driver identifying signal D that has passed through both the driver and the passenger in the first period.

Figure 10:
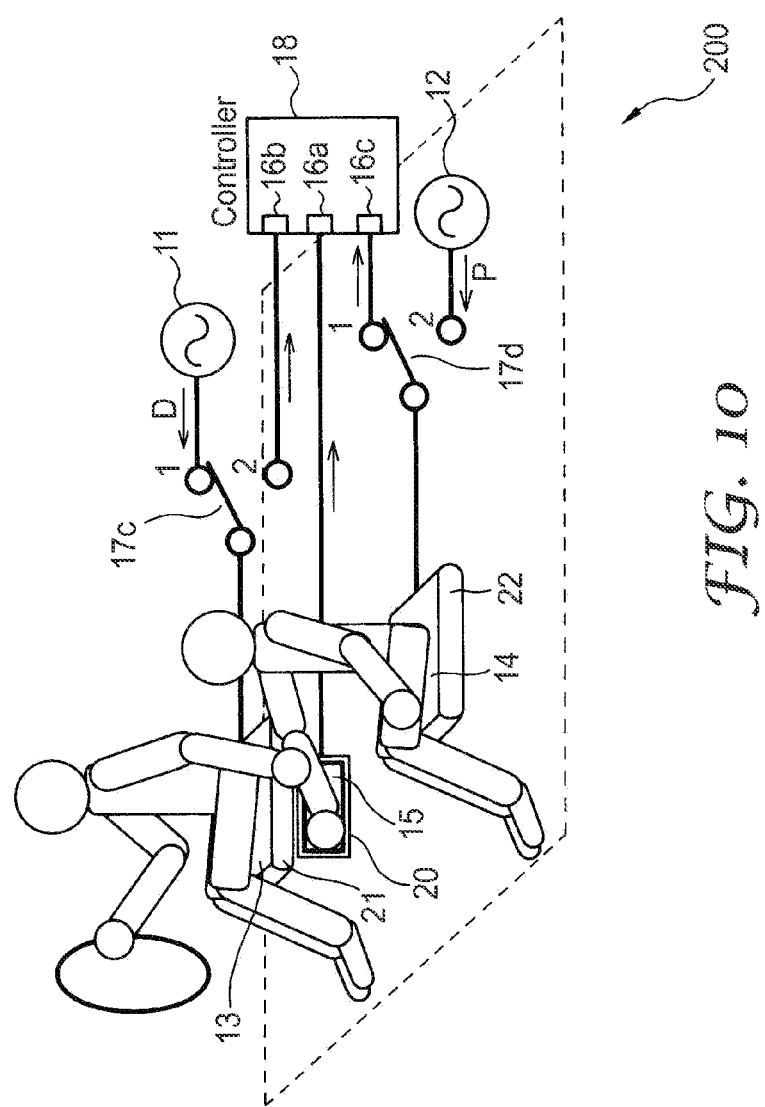
FIG. 10 is a diagram schematically showing the configuration of an operator identifying apparatus according to a modified example of the second embodiment of the present invention.

FIG. 10 shows schematically the configuration of an operator identifying apparatus 200 according to a modified example of the second embodiment. As shown in FIG. 10, the operator identifying apparatus 200 includes a detector 16c and a switch 17d in addition to the component elements of the operator identifying apparatus 2 according to the second embodiment. In FIG. 10, the component elements identical in construction and function to those in the operator identifying apparatus 2 are designated by the same reference numerals as those designating the corresponding component elements in the operator identifying apparatus 2. The operator identifying apparatus 200 will be describe below by dealing only with the differences from the operator identifying apparatus 2.

The switch 17d is controlled by the controller 18 and electrically connects the seat electrode 14 of the passenger seat 22 to the detector 16c in the first period and to the oscillator 12 in the second period.

Accordingly, in the first period during which the oscillator 11 is connected to the seat electrode 13 and outputs the driver identifying signal D, if the driver and the passenger are in physical contact with each other, the operator identifying apparatus 200 can detect, by means of the detector 16c, the driver identifying signal D that has passed through the driver and the passenger. Therefore, in the first period, if the absolute value of the maximum amplitude of the identifying signal detected by the detector 16a is larger than the threshold value $Th_a$, but the absolute value of the maximum amplitude of the identifying signal detected by the detector 16c is not larger than the threshold value $Th_b$, the controller 18 determines that the driver has operated the vehicle-mounted apparatus. On the other hand, in the first period, if the absolute value of the maximum amplitude of the identifying signal detected by the detector 16c is larger than the threshold value $Th_b$, the controller 18 determines that both of the driver and the passenger are involved in the operation of the vehicle-mounted apparatus. In the second period, the operator identifying apparatus 200 can determine whether the passenger has operated the vehicle-mounted apparatus and whether both of the driver and the passenger are involved in the operation of the vehicle-mounted apparatus, in the same manner as the operator identifying apparatus 2 does. Further, in the operator identifying apparatus 200, since the switches 17c and 17d are set so that one or the other of the oscillators 11 and 12 is disconnected from its associated seat electrode, only the identifying signal output from one or the other of the oscillators 11 and 12 can be transferred to the detector 16a. Accordingly, the oscillators 11 and 12 may be configured to constantly output the driver identifying signal D and the passenger identifying signal P, respectively.

According to this embodiment, in the first period as well as in the second period, it can be checked whether the driver and the passenger are in physical contact with each other.

A further modified example of the second embodiment of the present invention will be described with reference to FIG. 11.

Figure 11:
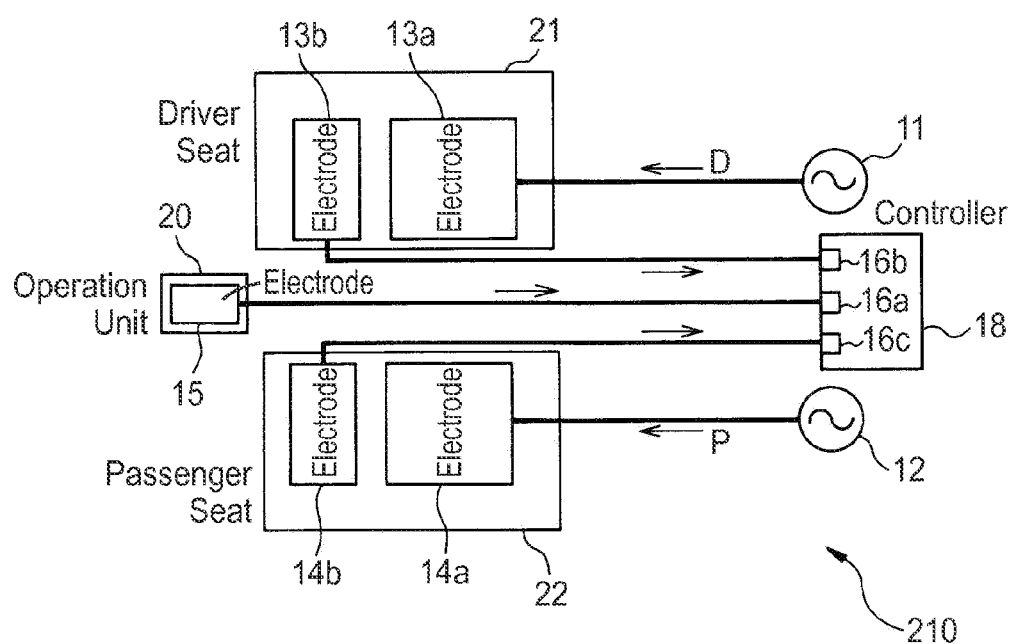
FIG. 11 is a diagram schematically showing the configuration of an operator identifying apparatus according to a further modified example of the second embodiment of the present invention.

FIG. 11 shows schematically the configuration of an operator identifying apparatus 210 according to the further modified example of the second embodiment. The operator identifying apparatus 210 differs from the operator identifying apparatus 200 in that the switches 17c and 17d are omitted and in that the seat electrodes 13 and 14 are each divided into two electrically insulated seat electrodes 13a and 13b or seat electrodes 14a and 14b, respectively. In FIG. 11, the component elements identical in construction and function to those in the operator identifying apparatus 200 are designated by the same reference numerals as those designating the corresponding component elements in the operator identifying apparatus 200. The operator identifying apparatus 210 will be describe below by dealing only with the differences from the operator identifying apparatus 200.

In the operator identifying apparatus 210, the seat electrode 13a is electrically connected to the oscillator 11. The seat electrode 13b is electrically connected to the detector 16b. On the other hand, the seat electrode 14a is electrically connected to the oscillator 12. The seat electrode 14b is electrically connected to the detector 16c.

Then, in the first period that the oscillator 11 is outputting the driver identifying signal D, the operator identifying apparatus 210 checks the signal detected by the detector 16a and the signal detected by the detector 16c, but disregards the signal detected by the detector 16b. In the first period, if the driver touches the operation unit 20 of the vehicle-mounted apparatus, the driver identifying signal D output from the oscillator 11 is transferred to the detector 16a by passing through the seat electrode 13a, the driver, and the electrode 15. Further, in the first period, if the driver and the passenger are in physical contact with each other, the driver identifying signal D output from the oscillator 11 is transferred to the detector 16c by passing through the seat electrode 13a, the driver, the passenger, and the seat electrode 14b. Accordingly, in the first period, the controller 18 can determine whether the driver has operated the vehicle-mounted apparatus and whether both of the driver and the passenger are involved with the operation of the vehicle-mounted apparatus, based on the result of the comparison between the absolute value of the amplitude of the identifying signal detected by the detector 16a and the threshold value $Th_a$ and on the result of the comparison between the absolute value of the amplitude of the identifying signal detected by the detector 16c and the threshold value $Th_b$, as in the operator identifying apparatus 200.

On the other hand, in the second period that the oscillator 12 is outputting the passenger identifying signal P, the operator identifying apparatus 210 checks the signal detected by the detector 16a and the signal detected by the detector 16b, but disregards the signal detected by the detector 16c. In the second period, if the passenger touches the operation unit 20 of the vehicle-mounted apparatus, the passenger identifying signal P is transferred to the detector 16a by passing through the seat electrode 14a, the passenger, and the electrode 15. Further, in the second period, if the driver and the passenger are in physical contact with each other, the passenger identifying signal P output from the oscillator 12 is transferred to the detector 16b by passing through the seat electrode 14a, the passenger, the driver, and the seat electrode 13b. Accordingly, in the second period, the controller 18 can determine whether the passenger has operated the vehicle-mounted apparatus and whether both of the driver and the passenger are involved with the operation of the vehicle-mounted apparatus, based on the result of the comparison between the absolute value of the amplitude of the identifying signal detected by the detector 16a and the threshold value $Th_a$ and on the result of the comparison between the absolute value of the amplitude of the identifying signal detected by the detector 16b and the threshold value $Th_b$, as in the operator identifying apparatus 200. In this way, since the operator identifying apparatus 210 can identify the operator of the vehicle-mounted apparatus without using moving parts such as switches, high tolerance to faults can be achieved.

A still further modified example of the second embodiment of the present invention will be described with reference to FIG. 12.

Figure 12:
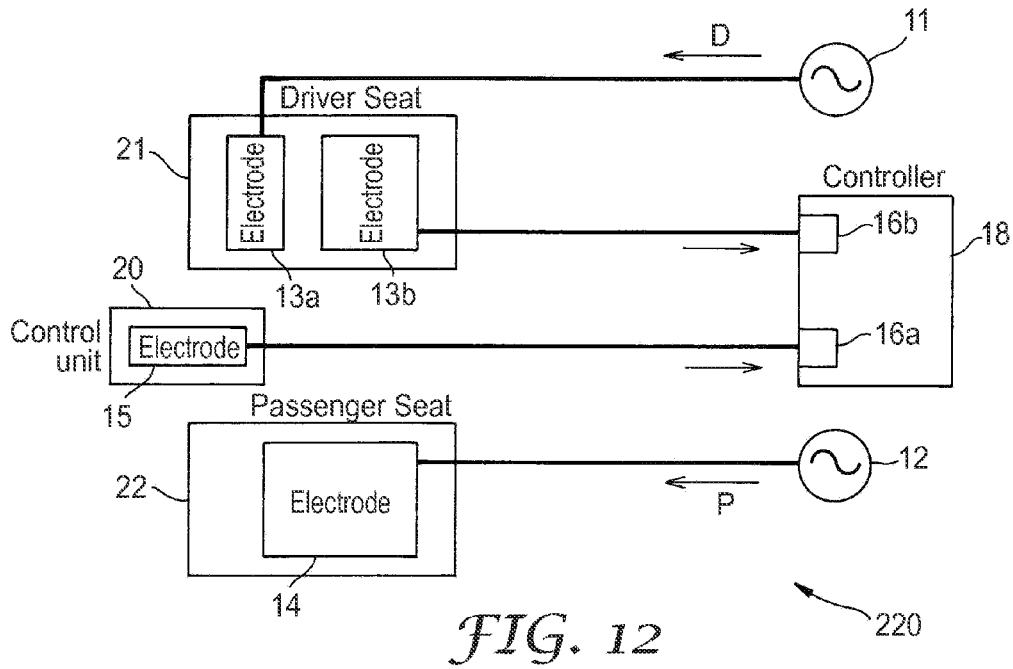
FIG. 12 is a diagram schematically showing the configuration of an operator identifying apparatus according to a still further modified example of the second embodiment of the present invention.

FIG. 12 shows schematically the configuration of an operator identifying apparatus 220 according to the still further modified example of the second embodiment. The operator identifying apparatus 220 differs from the operator identifying apparatus 2 in that the switch 17c is omitted and in that the seat electrode 13 is divided into two electrically insulated seat electrodes 13a and 13b. In FIG. 12, the component elements identical in construction and function to those in the operator identifying apparatus 2 are designated by the same reference numerals as those designating the corresponding component elements in the operator identifying apparatus 2. The operator identifying apparatus 220 will be describe below by dealing only with the differences from the operator identifying apparatus 2.

In the operator identifying apparatus 220, the seat electrode 13a is electrically connected to the oscillator 11. The seat electrode 13b is electrically connected to the detector 16b.

In the first period that the oscillator 11 is outputting the driver identifying signal D, the operator identifying apparatus 220 checks the signal detected by the detector 16a, but disregards the signal detected by the detector 16b. In the first period, if the driver touches the operation unit 20 of the vehicle-mounted apparatus, the driver identifying signal D output from the oscillator 11 is transferred to the detector 16a by passing through the seat electrode 13a, the driver, and the electrode 15.

On the other hand, in the second period that the oscillator 12 is outputting the passenger identifying signal P, the operator identifying apparatus 220 checks the signal detected by the detector 16a and the signal detected by the detector 16b. In the second period, if the passenger touches the operation unit 20 of the vehicle-mounted apparatus, the passenger identifying signal P output from the oscillator 12 is transferred to the detector 16a by passing through the seat electrode 14, the passenger, and the electrode 15. Further, in the second period, if the driver and the passenger are in physical contact with each other, the passenger identifying signal P is transferred to the detector 16b by passing through the seat electrode 14, the passenger, the driver, and the seat electrode 13b.

Figure 9:
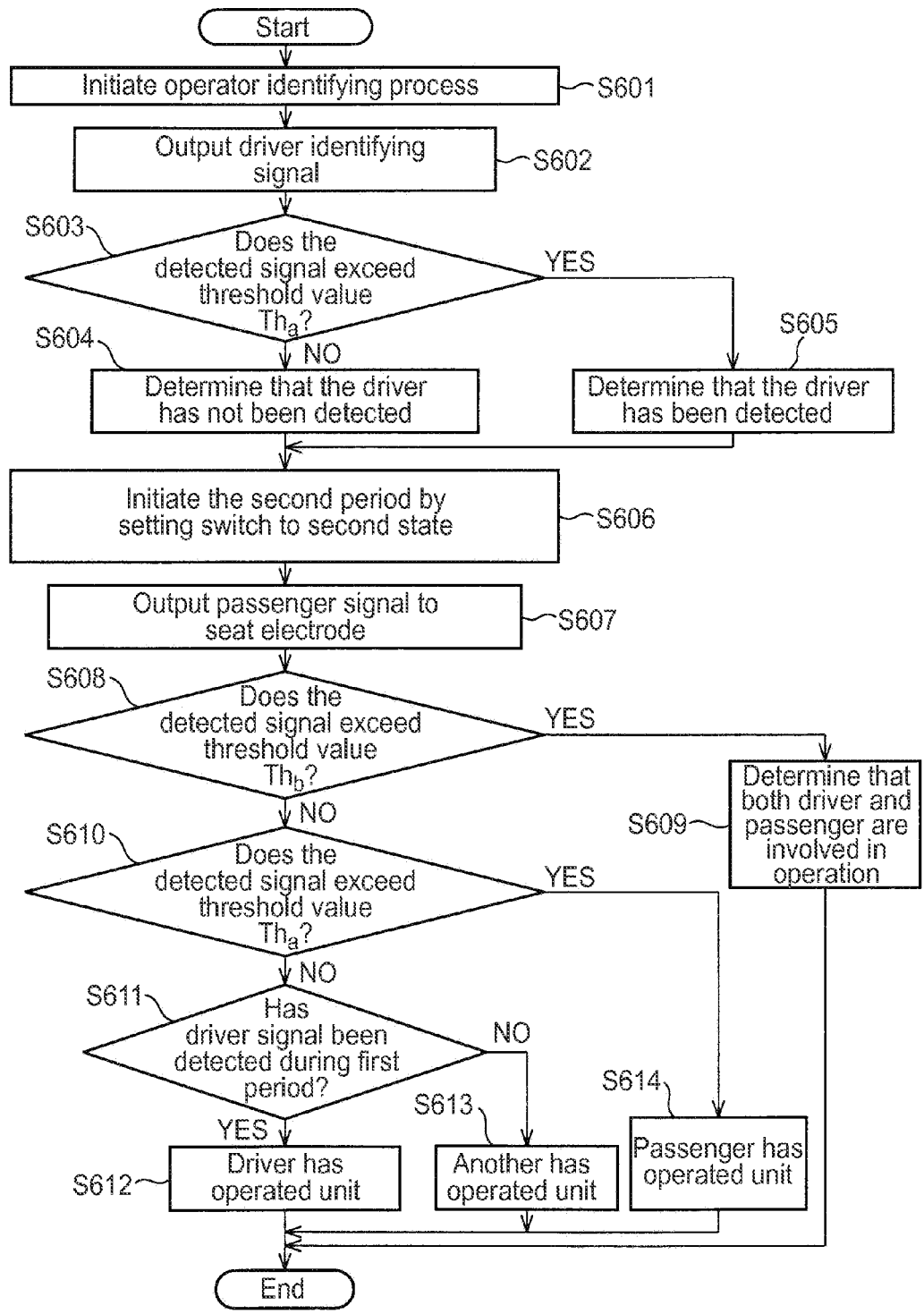
FIG. 9 is a flowchart showing a procedure for an operator identifying process performed by the operator identifying apparatus according to the second embodiment of the present invention.

Accordingly, the operator identifying apparatus 220 can identify the operator of the vehicle-mounted apparatus and determine whether both of the driver and the passenger are involved in the operation, by the same procedure as the operation procedure shown in FIG. 9.

A yet further modified example of the second embodiment of the present invention will be described with reference to FIG. 13.

Figure 13:
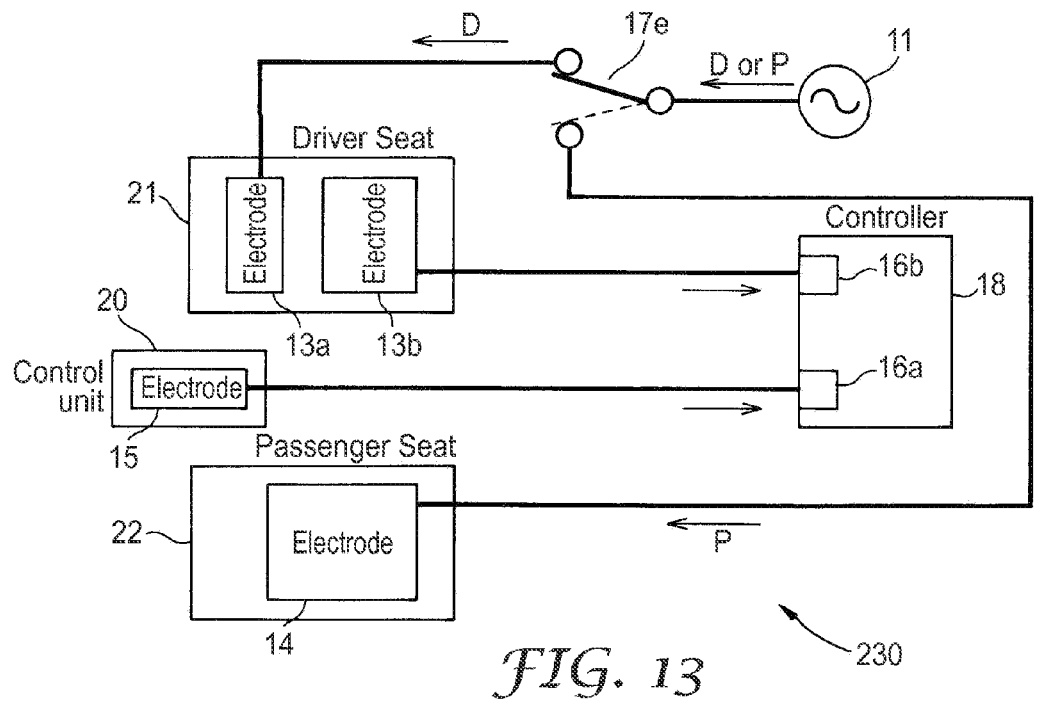
FIG. 13 is a diagram schematically showing the configuration of an operator identifying apparatus according to a yet further modified example of the second embodiment of the present invention.

FIG. 13 shows schematically the configuration of an operator identifying apparatus 230 according to the yet further modified example of the second embodiment. The operator identifying apparatus 230 differs from the operator identifying apparatus 220 in that the second oscillator 12 is omitted and in that the connection of the oscillator 11 is changed by a switch 17e. In FIG. 13, the component elements identical in construction and function to those in the operator identifying apparatus 220 are designated by the same reference numerals as those designating the corresponding component elements in the operator identifying apparatus 220. The operator identifying apparatus 230 will be describe below by dealing only with the differences from the operator identifying apparatus 220.

In the first period, the switch 17e in the operator identifying apparatus 230 connects the oscillator 11 to the seat electrode 13a. On the other hand, in the second period, the switch 17e connects the oscillator 11 to the seat electrode 14. When the switch 17e is operated in this manner, the oscillator 11 serves the function of the oscillator 12 of the operator identifying apparatus 220. That is, in the second period, the identifying signal output from the oscillator 11 serves as the passenger identifying signal P. Accordingly, while using only one oscillator, the operator identifying apparatus 230 can identify the operator of the vehicle-mounted apparatus and determine whether both of the driver and the passenger are involved in the operation, in the same manner as the operator identifying apparatus 220.

A still yet further modified example of the second embodiment of the present invention will be described with reference to FIG. 14.

Figure 14:
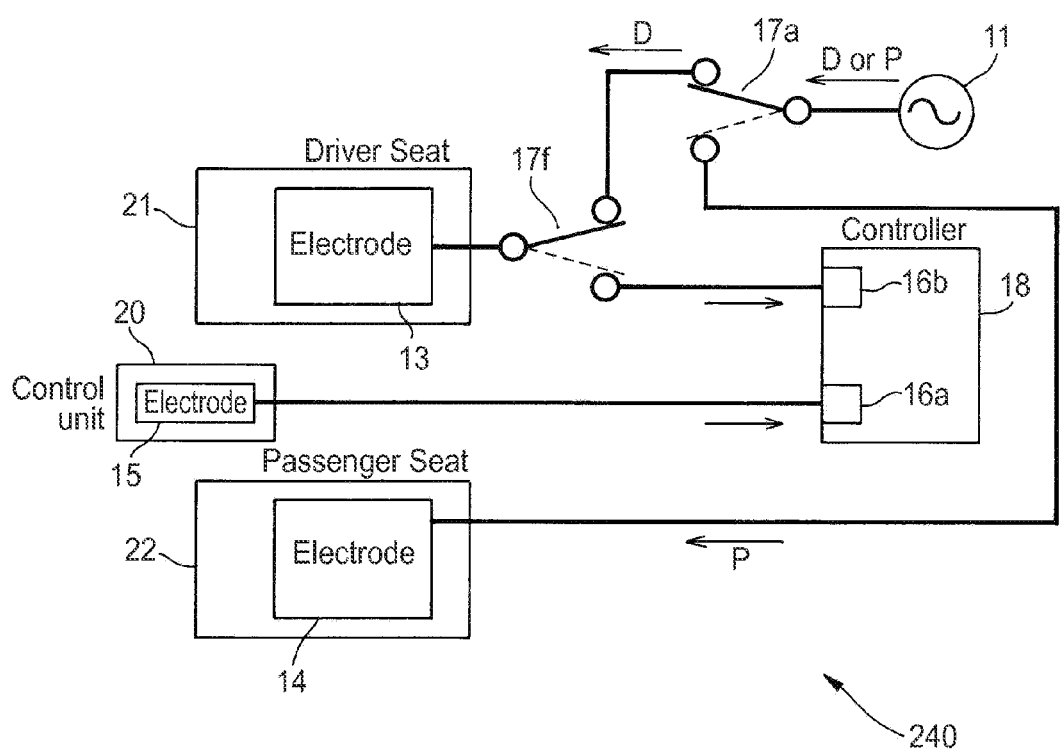
FIG. 14 is a diagram schematically showing the configuration of an operator identifying apparatus according to a still yet further modified example of the second embodiment of the present invention.

FIG. 14 shows schematically the configuration of an operator identifying apparatus 240 according to the still yet further modified example of the second embodiment. The operator identifying apparatus 240 differs from the operator identifying apparatus 230 in that the single seat electrode 13 is used instead of the seat electrodes 13a and 13b and in that the connection of the seat electrode 13 is changed by a switch 17f. In FIG. 14, the component elements identical in construction and function to those in the operator identifying apparatus 230 are designated by the same reference numerals as those designating the corresponding component elements in the operator identifying apparatus 230. The operator identifying apparatus 240 will be describe below by dealing only with the differences from the operator identifying apparatus 230.

In the first period, the switches 17e and 17f in the operator identifying apparatus 240 connects the oscillator 11 to the seat electrode 13. On the other hand, in the second period, the switch 17e connects the oscillator 11 to the seat electrode 14. The switch 17f connects the seat electrode 13 to the oscillator 16b. When the switches 17e and 17f are operated in this manner, the oscillator 11 serves the function of the oscillator 12 of the operator identifying apparatus 220. Even when only one seat electrode is mounted in the driver seat, in the second period the identifying signal passed through both the passenger and the driver can be detected by the detector 16b.

Accordingly, the operator identifying apparatus 240 can identify the operator of the vehicle-mounted apparatus and determine whether both of the driver and the passenger are involved in the operation, in the same manner as the operator identifying apparatus 230.

Next, an operator identifying apparatus according to a third embodiment of the present invention will be described.

In the operator identifying apparatus according to the third embodiment of the present invention, identifying signals identical in amplitude and frequency but inverted in phase with respect to each other are simultaneously transmitted to the driver seat and the passenger seat, respectively. In the operation of the operator identifying apparatus, when an operator touches the electrode provided on the operation unit of the vehicle-mounted apparatus, the identifying signal that flowed through the operator touching the electrode and through the electrode is detected by a detector, to identify the operator who operated the vehicle-mounted apparatus. On the other hand, when the driver and the passenger are in physical contact with each other, or when the driver and the passenger simultaneously touch the operation unit, the identifying signals cancel each other out, and their amplitudes decrease; taking advantage of this, the operator identifying apparatus detects only an identifying signal having a relatively large amplitude and thereby detects that only occupant, the driver or the passenger, has operated the vehicle-mounted apparatus.

Figure 15:
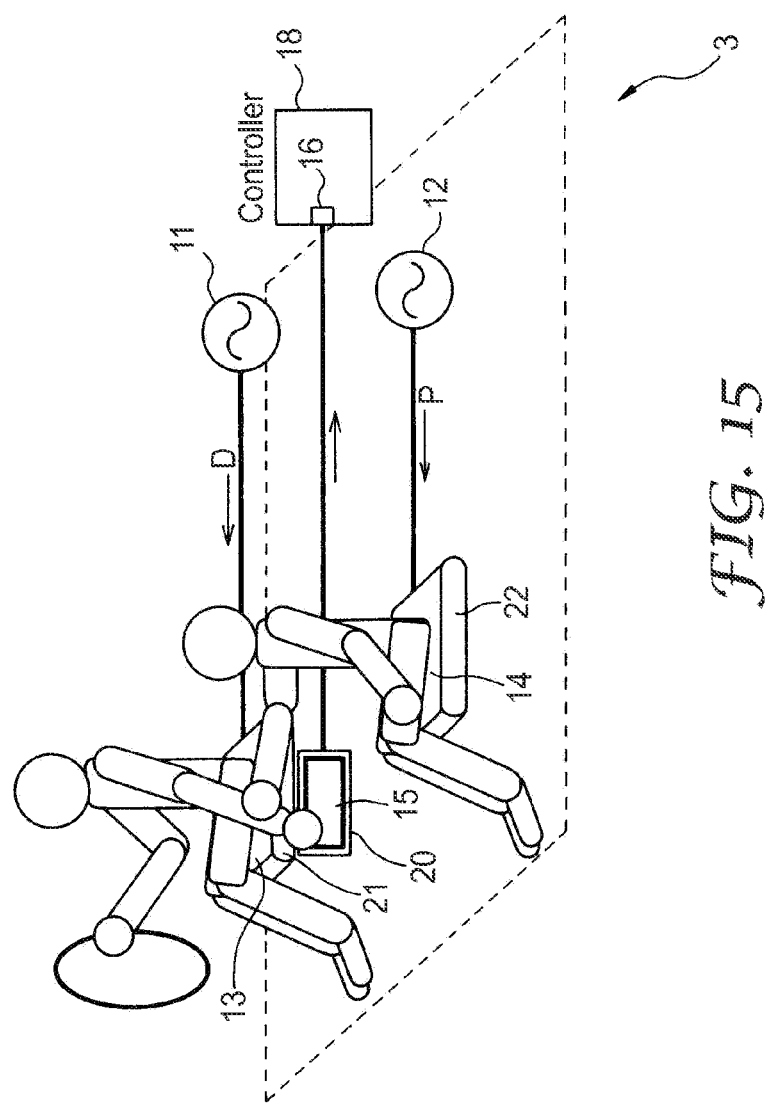
FIG. 15 is a diagram schematically showing the configuration of an operator identifying apparatus according to a third embodiment of the present invention.

FIG. 15 is a diagram schematically showing the configuration of the operator identifying apparatus 3 according to the third embodiment of the present invention. As shown in FIG. 15, the operator identifying apparatus 3 comprises two oscillators 11 and 12, two seat electrodes 13 and 14, an electrode 15, a detector 16, and a controller 18. In FIG. 15, the component elements identical in construction and function to those in the operator identifying apparatus 1 are designated by the same reference numerals as those designating the corresponding component elements in the operator identifying apparatus 1. The operator identifying apparatus 3 will be describe below by dealing only with the differences from the operator identifying apparatus 1.

The oscillator 11 is electrically connected to the seat electrode 13 mounted in the driver seat 21. The driver identifying signal D is supplied to the seat electrode 13. The driver identifying signal D is a signal wave oscillating with a prescribed frequency, and may be generated, for example, in the form of a rectangular wave, a sine wave, or a sawtooth wave. The prescribed frequency can be set equal to such a frequency that a plurality of signal waves are output during the period that the driver keeps touching the operation unit 20 of the vehicle-mounted apparatus when he or she operates the vehicle-mounted apparatus once, for example, to 1 kHz or 2 kHz.

On the other hand, the oscillator 12 is electrically connected to the seat electrode 14 mounted in the passenger seat 22. The oscillator 12 generates the passenger identifying signal P. The passenger identifying signal P is a signal wave substantially identical in frequency and amplitude to the driver identifying signal D.

The oscillators 11 and 12 are controlled by the controller 18 to operate in synchronism with each other, and the driver identifying signal D is inverted in phase with respect to the passenger identifying signal P.

The electrode 15 is electrically connected to the detector 16. When the driver touches the operation unit 20 of the vehicle-mounted apparatus, the electrode 15 transfers the driver identifying signal D to the detector 16. Likewise, when the passenger touches the operation unit 20, the electrode 15 transfers the passenger identifying signal P to the detector 16.

The detector 16 detects the driver identifying signal D or the passenger identifying signal P transferred thereto via the electrode 15. When the driver operates the operation unit 20 of the vehicle-mounted apparatus, the detector 16 measures the voltage of the signal transferred via the electrode 15 in the circuit formed by the oscillator 11, the seat electrode 13, the driver, and the electrode 15. When the passenger operates the operation unit 20 of the vehicle-mounted apparatus, the detector 16 measures the voltage of the signal transferred via the electrode 15 in the circuit formed by the oscillator 12, the seat electrode 14, the passenger, and the electrode 15.

The detector 16 transmits the result of the measurement of the signal waveform (for example, the maximum and minimum values of the measured voltage) to the controller 18.

The controller 18 controls the oscillators 11 and 12. Further, based on the result of the measurement of the signal waveform received from the detector 16, the controller 18 determines whether the person that operated the vehicle-mounted apparatus is the driver or the passenger. The controller 18 also checks whether both of the driver and the passenger are involved in the operation of the vehicle-mounted apparatus. As in the first embodiment, the sentence "both of the driver and the passenger are involved in the operation of the vehicle-mounted apparatus" refers not only to the situation where the driver or the passenger touches the operation unit of the vehicle-mounted apparatus while the driver and the passenger are in physical contact with each other, but also to the situation where the driver and the passenger simultaneously touch the operation unit, regardless of whether they are in physical contact with each other.

Figure 16A:
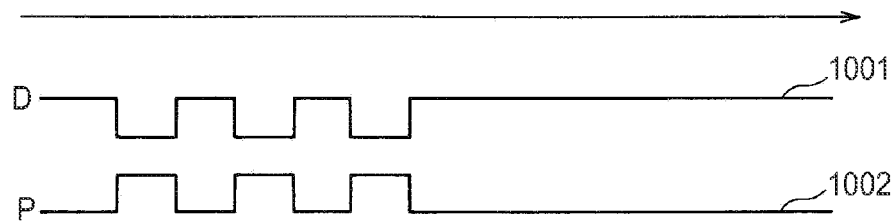
FIGS. 16a through 16d are timing charts of identifying signals output from oscillators and signals detected by a detector in the operator identifying apparatus according to the third embodiment of the present invention.
Figure 16B:
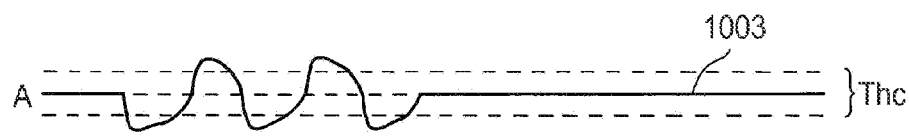
Figure 16C:
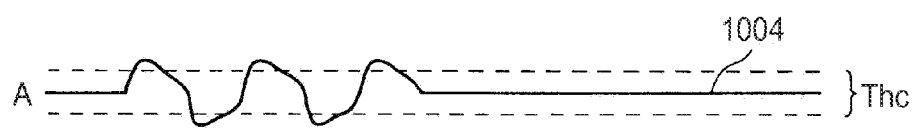
Figure 16D:
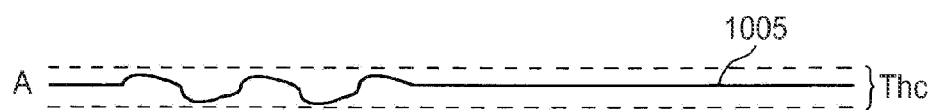

The operator identifying process that the controller 18 performs to identify the operator of the vehicle-mounted apparatus will be described with reference to the timing charts of FIGS. 16(a) to 16(d). FIG. 16(a) shows the signal waveform 1001 of the driver identifying signal D and the signal waveform 1002 of the passenger identifying signal P. FIG. 16(b) shows the waveform 1003 that the detector 16 detects when the driver touches the operation unit 20 of the vehicle-mounted apparatus. FIG. 16(c) shows the waveform 1004 that the detector 16 detects when the passenger touches the operation unit 20 of the vehicle-mounted apparatus. Further, FIG. 16(d) shows the waveform 1005 that the detector 16 detects when the driver or the passenger touches the operation unit 20 of the vehicle-mounted apparatus while the driver and the passenger are in physical contact with each other. In FIGS. 16(a) to 16(d), the abscissa represents the elapsed time. Further, in FIGS. 16(a) to 16(d), the ordinate represents the voltage, and A indicates the reference voltage. The difference between the maximum or minimum value of the voltage measured by the detector 16 and the reference voltage A represents the maximum amplitude of the signal detected by the detector 16.

During the period that the oscillator 11 is outputting the driver identifying signal D, if the driver seated in the driver seat 21 touches the operation unit 20 to operate the vehicle-mounted apparatus, the driver identifying signal D flows to the detector 16 by passing through the seat electrode 13, the driver, and the electrode 15. As a result, as shown in FIG. 16(b), the detector 16 can detect a relatively large amplitude signal oscillating with the same period as the driver identifying signal D.

Likewise, during the period that the oscillator 12 is outputting the passenger identifying signal P, if the passenger seated in the passenger seat 22 touches the operation unit 20 of the vehicle-mounted apparatus, the passenger identifying signal P output from the oscillator 12 flows to the detector 16 by passing through the seat electrode 14, the passenger, and the electrode 15. As a result, as shown in FIG. 16(c), the detector 16 can detect a relatively large amplitude signal oscillating with the same period as the passenger identifying signal P.

Further, if the driver or the passenger touches the operation unit 20 of the vehicle-mounted apparatus while the driver and the passenger are in physical contact with each other, or if the driver and the passenger simultaneously touch the operation unit 20, regardless of whether they are in physical contact with each other, the driver identifying signal D and the passenger identifying signal P both flow to the detector 16 via the electrode 15. In this embodiment, the driver identifying signal D and the passenger identifying signal P are identical in amplitude and frequency but inverted in phase with respect to each other, as earlier described. As a result, at the detector 16, the driver identifying signal D and the passenger identifying signal P cancel each other out. Therefore, the amplitude of the identifying signal detected by the detector 16 in this case is smaller than would be the case if only one or the other of the driver identifying signal D and the passenger identifying signal P were transferred to the detector 16.

Figure 17:
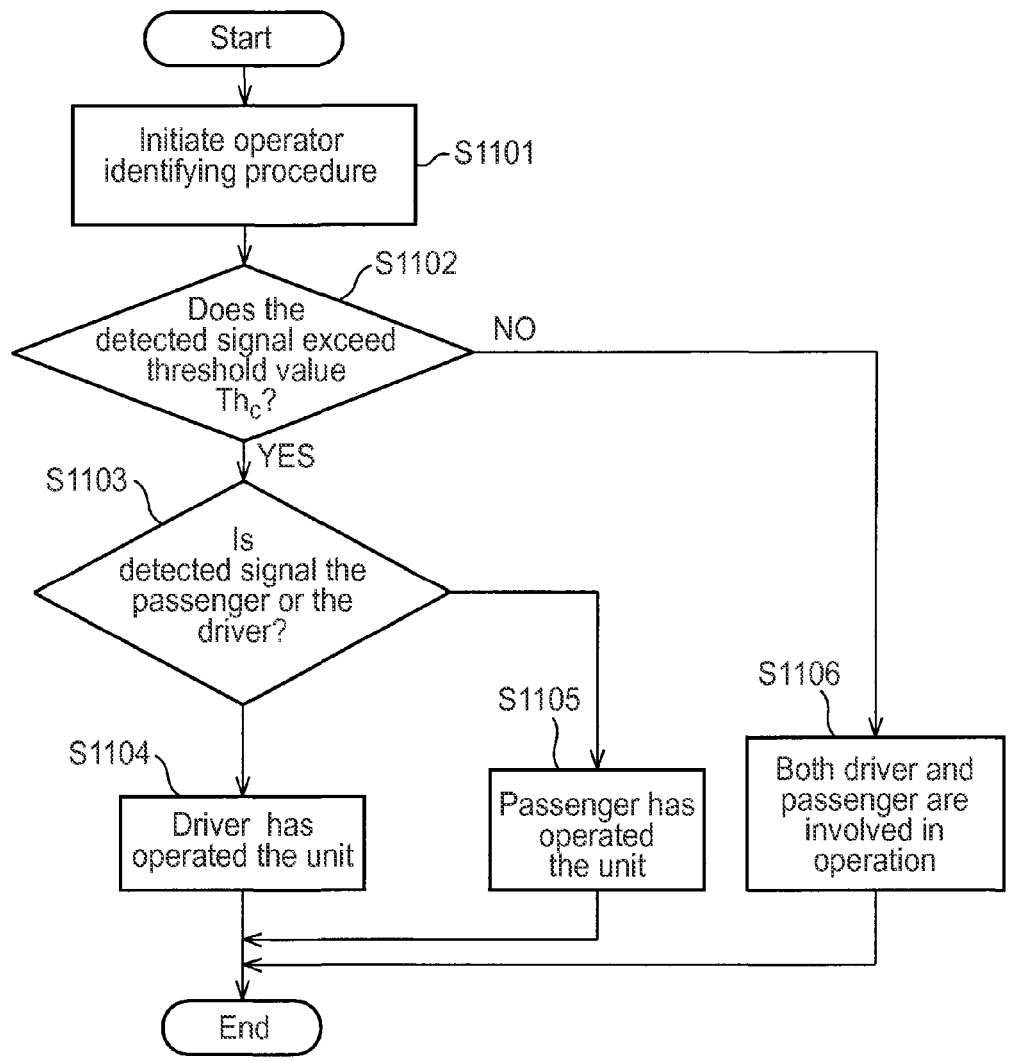
FIG. 17 is a flowchart showing a procedure for an operator identifying process performed by the operator identifying apparatus according to the third embodiment of the present invention.

Next, the operation procedure by which the controller 18 carries out the operator identifying process will be described below with reference to the flowchart shown in FIG. 17.

First, when the vehicle-mounted apparatus detects its operation unit 20 being operated and instructs the operator identifying apparatus 3 to initiate the operator identifying process, the controller 18 causes the oscillator 11 to output the driver identifying signal D to the seat electrode 13. The controller 18 also causes the oscillator 12 to output to the seat electrode 14 the passenger identifying signal P identical in amplitude and frequency to the driver identifying signal D but inverted in phase with respect to the driver identifying signal D (step 1101).

Next, the controller 18 checks whether the absolute value of the maximum amplitude of the signal detected by the detector 16 exceeds a predetermined threshold value $Th_c$ (step S1102). If the absolute value of the maximum amplitude of the detected signal is larger than the threshold value $Th_c$ in step S1102, the controller 18 determines that either the driver identifying signal D or the passenger identifying signal P has been detected. Then, the controller 18 checks whether the detected signal is the driver identifying signal D or the passenger identifying signal P (step S1103).

In step S1103, if the amplitude of the signal detected by the detector 16 during the positive swing of the driver identifying signal D is larger than the predetermined threshold value $Th_c$, the controller 18 determines that the driver identifying signal D has been detected. Likewise, if the amplitude of the signal detected during the negative swing of the driver identifying signal D is smaller than the threshold value $-Th_c$, the controller 18 may determine that the driver identifying signal D has been detected.

Conversely, if the amplitude of the signal detected by the detector 16 during the positive swing of the passenger identifying signal P is larger than the threshold value $Th_c$, the controller 18 determines that the passenger identifying signal P has been detected. Likewise, if the amplitude of the signal detected during the negative swing of the passenger identifying signal P is smaller than the threshold value $-Th_c$, the controller 18 may determine that the passenger identifying signal P has been detected.

Further, the controller 18 may compare the detected signal with the threshold value $Th_c$ a plurality of times in order to prevent an erroneous detection due to noise, etc. For example, if the amplitude of the detected signal exceeding the threshold value $Th_c$ during the positive swing of the driver identifying signal D, or the amplitude of the detected signal exceeding the threshold value $-Th_c$ during the negative swing of the driver identifying signal D, has been detected a plurality of times, the controller 18 may determine that the driver identifying signal D has been detected. Here, since the passenger identifying signal P is inverted in phase with respect to the driver identifying signal D, it is clear that there is no possibility of the detector 16 detecting both the identifying signals simultaneously swinging in the positive direction or in the negative direction.

If it is determined in step S1103 that the detected signal is the driver identifying signal D, the controller 18 determines that the driver has operated the operation unit 20 (step S1104). On the other hand, if it is determined that the detected signal is the passenger identifying signal P, the controller 18 determines that the passenger has operated the operation unit 20 (step S1105).

On the other hand, if the absolute value of the maximum amplitude of the signal detected by the detector 16 is not larger than the threshold value $Th_c$ in step S1102, the controller 18 determines that both the driver and the passenger are involved in the operation of the vehicle-mounted apparatus (step S1106).

After terminating the above process, the controller 18 sends an operator identifying signal indicating the result of the operator identification to the vehicle-mounted apparatus.

The threshold value $Th_c$ is determined so as to satisfy the following condition.

$$(NoiseFloor) < \left(\left|\frac{|V_{operator}|}{\alpha} - \frac{|V_{toucher}|}{\beta}\right| + V_{m2}\right) \leq Th_c \leq (V_{smaller} - V_{m1}) \quad (2)$$

Here, NoiseFloor is the noise floor. $V_{smaller}$ represents the voltage value corresponding to the amplitude of the driver identifying signal D or the passenger identifying signal P, whichever is smaller, when the driver identifying signal D or the passenger identifying signal P is transferred to the detector 16 by passing only through the driver or the passenger, respectively, when the driver and the passenger are not in physical contact with each other. $V_{operator}$ represents the voltage value corresponding to the amplitude of the driver identifying signal D or the passenger identifying signal P transferred to the detector 16 by passing only through the driver or the passenger, whichever occupant is touching the operation unit 20, when the driver and the passenger are in physical contact with each other. Further, $V_{toucher}$ represents the voltage value corresponding to the amplitude of the driver identifying signal D or the passenger identifying signal P transferred to the detector 16 by passing through both the driver and the passenger. $V_{m1}$ and $V_{m2}$ are each a margin value for preventing an erroneous detection. Further, $\alpha$ and $\beta$ are the attenuation factors of $V_{operator}$ and $V_{toucher}$, respectively.

As shown by equation (2), the threshold value $Th_c$ is set larger than the value obtained by adding the margin $V_{m2}$ to the absolute difference between the quotient of $V_{operator}$ by $\alpha$ and the quotient of $V_{toucher}$ by $\beta$. The reason is that the driver identifying signal D is inverted in phase with respect to the passenger identifying signal P and, at the detector 16, the driver identifying signal D and the passenger identifying signal P cancel each other out when the driver and the passenger are in physical contact with each other. The attenuation factors $\alpha$ and $\beta$ are given by $$\alpha = \frac{Z_{operator} + Z_{toucher}}{Z_{toucher}}$$

$$\beta = \frac{Z_{operator} + Z_{toucher}}{Z_{operator}}$$

Here, $Z_{operator}$ is the ground impedance of the driver or the passenger, whichever occupant is touching the operation unit 20, when the driver and the passenger are in physical contact with each other. On the other hand, $Z_{toucher}$ is the ground impedance of the driver or the passenger, whichever occupant is not touching the operation unit 20, when the driver and the passenger are in physical contact with each other. When the driver and the passenger are in physical contact with each other, it can be considered that a ground impedance has been added to both the occupant touching the operation unit 20 and the occupant not touching the operation unit 20. Accordingly, assuming that the input impedance of the detector 16 is sufficiently large, the reciprocals of the voltage dividing ratios of $Z_{operator}$ and $Z_{toucher}$ provide the respective attenuation factors $\alpha$ and $\beta$.

Further, as shown by equation (2), the threshold value $Th_c$ is set equal to the value obtained by subtracting the margin value $V_{m1}$ from $V_{smaller}$. As a result, when the driver and the passenger are not in physical contact with each other, the maximum amplitude of the identifying signal transferred to the detector 16 by passing only through the driver or the passenger can be prevented from becoming equal to or smaller than $Th_c$. Accordingly, the controller 18 can reliably detect which occupant, the driver or the passenger, has operated the operation unit 20 when the occupants are not in physical contact with each other.

As described above, by simultaneously supplying the driver identifying signal and the passenger identifying signal, one inverted in phase with respect to the other, and by detecting the identifying signals by the detector 16 through the electrode provided on the operation unit 20 of the vehicle-mounted apparatus, the operator identifying apparatus 3 according to the third embodiment of the present invention can identify which occupant, the driver or the passenger, has operated the vehicle-mounted apparatus. Further, in the operator identifying apparatus 3, when the driver and the passenger are in physical contact with each other, the driver identifying signal D and the passenger identifying signal P cancel each other out, and their amplitudes decrease when detected by the detector 16. Accordingly, the operator identifying apparatus 3 can determine whether both of the driver and the passenger are involved in the operation of the vehicle-mounted apparatus, by checking whether the amplitude of the identifying signal detected by the detector 16 is smaller than would be the case if only either one of the identifying signals were transferred to the detector 16.

Next, a description will be given of a navigation system as an example of a vehicle-mounted apparatus that uses the above-described operator identifying apparatus.

Figure 18:
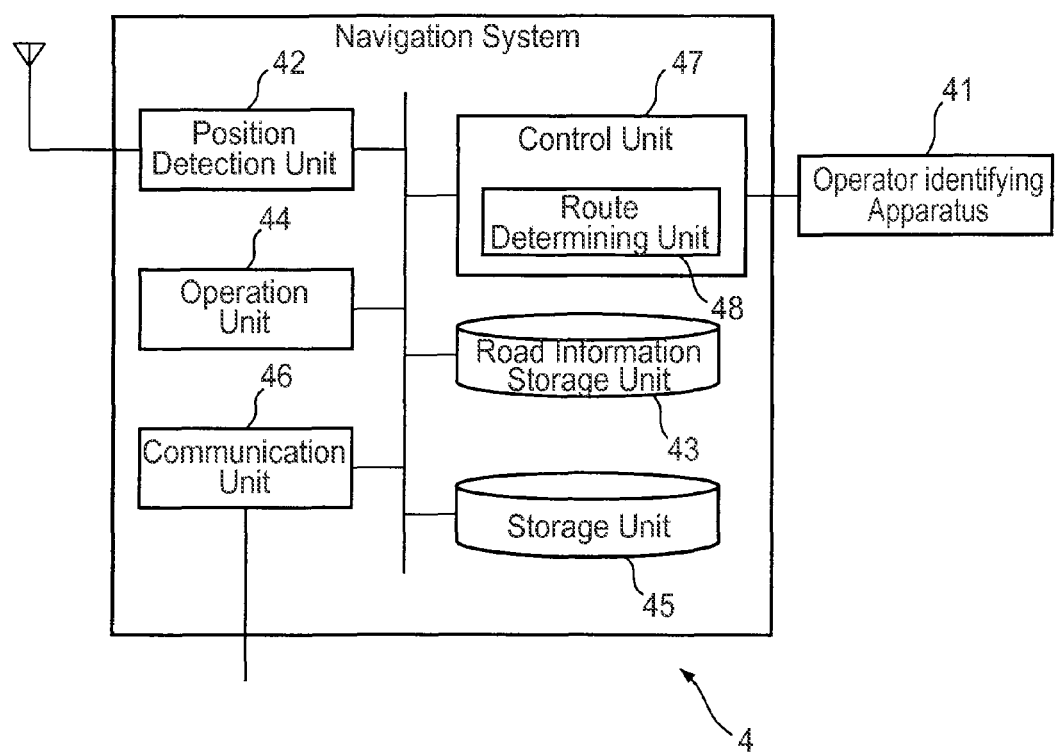
FIG. 18 is a functional block diagram of a navigation system incorporating the operator identifying apparatus according to the present invention.

FIG. 18 is a functional block diagram of the navigation system 4 incorporating the above-described operator identifying apparatus. The navigation system 4 comprises, in addition to the operator identifying apparatus 41, a position detection unit 42, a road information storage unit 43, an operation unit 44, a storage unit 45, a communication unit 46, and a control unit 47.

The operator identifying apparatus according to any one of the above-described embodiments of the present invention can be used as the operator identifying apparatus 41. When any kind of operation is performed via the operation unit 44, the operator identifying apparatus 41 transmits to the control unit 47 an operator identifying signal indicating which occupant, the driver or the passenger, has operated the operation unit 44 and whether both of the driver and the passenger are involved in the operation of the navigation system 4. Here, the sentence "both of the driver and the passenger are involved in the operation of the navigation system 4" refers not only to the situation where the driver or the passenger touches the operation unit 44 while the driver and the passenger are in physical contact with each other, but also to the situation where the driver and the passenger simultaneously touch the operation unit 44, regardless of whether they are in physical contact with each other, as earlier described.

The position detection unit 42 detects the current position and heading direction of the vehicle equipped with the navigation system 4. For this purpose, the position detection unit 42 includes sensors, for example, a geomagnetic sensor, a gyroscope, and a distance sensor, and a GPS receiver. The geomagnetic sensor is used to acquire absolute heading, and the gyroscope to detect relative heading. The distance sensor is used to calculate the traveled distance from the start point, based on vehicle speed pulse signals. The GPS receiver obtains the latitude and longitude of the vehicle's current position, based on the information received from GPS satellites forming the GPS (Global Positioning System). By combining these pieces of information, the position detection unit 42 detects the current position and heading direction of the vehicle. The geomagnetic sensor, the gyroscope, the distance sensor, and the GPS receiver are well known in the art, and therefore, will not be discussed in detail here. The method of detecting the vehicle's current position and heading direction by combining the information from the various sensors is also known in the art, and will not be discussed in detail here.

The position detection unit 42 detects the current position and heading direction of the vehicle at predetermined intervals of distance or time for transmission to the control unit 47.

The road information storage unit 43 acquires a road map, including road information for the area containing the vehicle's current position, and transmits it to the control unit 47. For this purpose, the road information storage unit 43 includes, for example, a recording medium such as a DVD or a CD with map information recorded thereon and a device for reading the recording medium. The road information comprises, for example, nodes that indicate intersections and links that indicate roads connecting between the intersections. Each node is associated with identification information for the node, the position of the node, identification information for the links connected to the node, etc. Each link is associated with identification information for the link, the position and length of the link, the type of the road (for example, an ordinary road or an expressway), information concerning one-way traffic, etc. The road information storage unit 43 may be configured to acquire the map information from a server via a radio communication network.

The operation unit 44 is a user interface for operating the navigation system 4. For this purpose, the operation unit 44 is constructed, for example, from a touch panel display. Upon detecting an operation performed thereon, the operation unit 44 sends a signal indicating the kind of the operation to the control unit 47. Further, the electrode of the operator identifying apparatus 41 is provided on the operation unit 44 so that, when the driver or the passenger operates the operation unit 44 by touching it, the driver identifying signal D or the passenger identifying signal P is transferred to the detector via the electrode, as previously described.

If the operation unit 44 has a transparent conductive film in the portion that is touched by the driver or other occupant, like a resistive-film or capacitive type touch panel, as described above, the transparent conductive film may be used as the electrode of the operator identifying apparatus 41.

The storage unit 45 comprises, for example, an alterable non-volatile semiconductor memory or a magnetic recording medium and a device for reading it. The storage unit 45 is used to store a program to be executed by the control unit 47 and various kinds of setup parameters used in the program.

The communication unit 46 includes a communication interface for communicating with other devices in the vehicle via an in-vehicle network, and its peripheral circuitry. The communication unit 46 acquires via the in-vehicle network the sensor signals detected by the various kinds of sensors, such as a vehicle speed sensor, installed in the vehicle.

The control unit 47 comprises one or more microcomputers not shown, each comprising a CPU, ROM, RAM, etc., and their peripheral circuitry. The control unit 47 controls the various units of the navigation system 4. For example, based on the vehicle's current position, etc. obtained from the position detection unit 42, the control unit 47 acquires the map, including the road information for the area containing the vehicle's current position, from the road information storage unit 43. Then, the control unit 47 generates image data by placing a symbol indicating the vehicle's current position on the acquired map, and presents the image data for viewing on the display of the navigation system 4. The control unit 47 further includes a route determining unit 48 as a software module which is executed on the CPU of the control unit 47. The route determining unit 48 calculates the shortest route from the current position to the destination, based on the destination entered via the operation unit 44 and on the vehicle's current position, map information, etc. Then, based on the shortest route thus calculated, the control unit 47 provides route guidance instructions to the driver by presenting heading information, such as straight ahead, turn right, or turn left, visually on the display and/or audibly via a speaker as the vehicle approaches an intersection.

Further, when an operation signal is entered from the operation unit 44, the control unit 47 transmits an instruction to the operator identifying apparatus 41 to initiate the operator identifying process. Then, when an operator identifying signal is received from the operator identifying apparatus 41, if the vehicle is moving the control unit 47 determines whether to enable or disable the entered operation based on the operator identifying signal. In the present embodiment, if the vehicle speed acquired from the vehicle speed sensor (not shown) installed in the vehicle is not slower than a predetermined speed, for example, 5 km/h or higher, the control unit 47 determines that the vehicle is moving. Then, if the operator identifying signal indicates that the driver has performed the operation or both of the driver and the passenger are involved in the operation of the navigation system 4, the control unit 47 disables the operation. On the other hand, if the operator identifying signal indicates that the passenger or a third person has performed the operation, the control unit 47 enables the operation and carries out processing that matches the operation. If the vehicle speed acquired from the vehicle speed sensor is slower than the predetermined speed, for example, slower than 5 km/h, the control unit 47 determines that the vehicle is stationary, and enables the operation whoever the operator was.

In this way, since any operation performed by the driver on the navigation system 4 is disabled when the vehicle is moving, the possibility of the driver's attention being directed to operating the navigation system 4 during driving can be reduced, thus serving to enhance safety during vehicle driving. Furthermore, when the operator identifying signal is received that indicates that both of the driver and the passenger are involved in the operation of the navigation system 4, if the vehicle is moving the navigation system 4 disables the operation and thus prohibits the driver from performing an illegal operation; this also serves to enhance safety during vehicle driving.

The operator identifying apparatus according to the present invention can also be applied to other vehicle-mounted apparatus such as an audio system, and the driver's operation during vehicle driving can be disabled in the same manner as described above. More specifically, when an operation is performed via the operation unit, the control unit of the vehicle-mounted apparatus instructs the operator identifying apparatus to initiate the operator identifying process, as in the navigation system described above. Then, based on the operator identifying signal received from the operator identifying apparatus, the control unit determines whether to enable or disable the operation. If it is determined that the operation is to be enabled, the operation unit carries out the processing corresponding to that operation (for example, adjusting the volume level, changing radio stations, playing the CD player, etc. if the vehicle-mounted apparatus is an audio system). When the present invention is applied to an apparatus related to the operation of the vehicle, the apparatus may be configured to enable the operation only when the operation identifying signal received from the operator identifying apparatus indicates that the person that performed the operation is the driver. The operator identifying apparatus according to the present invention can also be used in other than automotive applications. When using the operator identifying apparatus according to the present invention in other than automotive applications, the seat electrodes mounted in the driver seat and the passenger seat, respectively, should be mounted in areas that respectively contact the first and second operators to be identified. Then, the electrode for transferring the first operator identifying signal (which corresponds to the driver identifying signal) and the second operator identifying signal (which corresponds to the passenger identifying signal) to the detector should be provided in the portion that both the first and second operators may touch for operation.

Further, the operator identifying apparatus according to the present invention may be integrated into the target apparatus whose operator is to be identified. When the operator identifying apparatus is integrated into the target apparatus, the control unit of the target apparatus can be constructed to serve the function of the controller of the operator identifying apparatus.

As described above, a person skilled in the art can make various changes and modifications to match any mode of implementation without departing from the scope of the invention.

The invention claimed is:

1. An operator identifying apparatus for identifying an operator that has operated an apparatus having an operation unit, comprising:
   a first oscillator for outputting a first identifying signal;
   a first electrode connected to said first oscillator and disposed so as to be able to transfer said first identifying signal to a first operator;
   a second oscillator for outputting a second identifying signal that has a signal characteristic different from said first identifying signal;
   a detector array including at least one detector for detecting said first identifying signal or said second identifying signal;
   a second electrode for transferring said second identifying signal to a second operator during a first period that said first oscillator is outputting said first identifying signal and said second oscillator is outputting said second identifying signal, and for transferring said first identifying signal, when coupled to said second operator via said first operator, to said detector array during a second period that said first oscillator is outputting said first identifying signal but that is different from said first period;
   a third electrode, disposed on said operation unit, for transferring said first identifying signal or said second identifying signal to said detector array when said first operator or said second operator touches said operation unit; and,
   a controller connected to said detector array, wherein
   when said detector array detected said first identifying signal during said first period but did not detect said first identifying signal during said second period, said controller determines that said first operator has operated said operation unit, and
   when said detector array detected said first identifying signal during said second period, said controller determines that both of said first operator and said second operator are involved in the operation of said apparatus.

2. The operator identifying apparatus according to claim 1, further comprising a switch for connecting said third electrode to said detector array and said second oscillator to said second electrode during said first period, and for connecting said second electrode to said detector array and disconnecting said second oscillator from said second electrode during said second period.

3. The operator identifying apparatus according to claim 1, wherein said detector array includes a first detector for detecting said first or second identifying signal during said first period, and a second detector for detecting said first identifying signal during said second period, and
   said third electrode is connected to said first detector, and wherein
   said operator identifying apparatus further includes a switch for connecting said second oscillator to said second electrode during said first period, and for connecting said second detector to said second electrode during said second period.

4. The operator identifying apparatus according to claim 1, wherein said second electrode includes a first sub-electrode connected to said second oscillator and a second sub-electrode, and wherein
   said operator identifying apparatus further includes a switch for connecting said third electrode to said detector array during said first period, and for connecting said second sub-electrode to said detector array during said second period.

5. The operator identifying apparatus according to claim 1, wherein said detector array includes a first detector for detecting said first or second identifying signal during said first period, and a second detector for detecting said first identifying signal during said second period, said third electrode is connected to said first detector, and said second electrode includes a first sub-electrode connected to said second oscillator and a second sub-electrode connected to said second detector.

6. The operator identifying apparatus according to claim 1, wherein when said detector array detected said second identifying signal during said first period and did not detect said first identifying signal during said second period, said controller determines that said second operator has operated said operation unit.

7. The operator identifying apparatus according to claim 1, wherein said first identifying signal and said second identifying signal have the same oscillation frequency but are inverted in phase with respect to each other, and wherein in said first period, said controller determines that said first identifying signal has been detected when the signal detected by said detector array is identical in phase and frequency to said first identifying signal, but determines that said second identifying signal has been detected when the signal detected by said detector array is identical in phase and frequency to said second identifying signal.

8. The operator identifying apparatus according to claim 1, wherein said first identifying signal and said second identifying signal have different oscillation frequencies, and wherein in said first period, said controller determines that said first identifying signal has been detected when the signal detected by said detector array is identical in frequency to said first identifying signal, but determines that said second identifying signal has been detected when the signal detected by said detector array is identical in frequency to said second identifying signal.

9. A vehicle-mounted apparatus comprising:
an operator identifying apparatus as described in claim 1;
an operation unit; and,
a control unit for performing processing in response to an operation that a first operator or a second operator has performed via said operation unit, and wherein
when said operation unit is operated during vehicle driving, if a signal indicating that said first operator has performed said operation unit or a signal indicating that both of said first operator and said second operator are involved in said operation is received from said operator identifying apparatus, said control unit disables said operation.

10. An operator identifying apparatus for identifying an operator that has operated an apparatus having an operation unit, comprising:
an oscillator array, including at least one oscillator, for outputting a first identifying signal during a first period and for outputting a second identifying signal during a second period that is different from said first period;
a first electrode disposed so as to be able to transfer said first identifying signal to a first operator;
a second electrode disposed so as to be able to transfer said second identifying signal to a second operator;
a first detector for detecting said first identifying signal or said second identifying signal;
a third electrode, disposed on said operation unit and connected to said first detector, for transferring said first identifying signal or said second identifying signal to said first detector when said first operator or said second operator touches said operation unit;
a second detector for detecting said second identifying signal passed through said second operator and said first operator during said second period; and,
a controller connected to said first and second detectors, wherein
when said first detector detected said first identifying signal during said first period, and when neither said first detector nor said second detector detected said second identifying signal during said second period, said operator determines that said first operator has operated said operation unit, and
when said second detector detected said second identifying signal during said second period, said controller determines that both of said first operator and said second operator are involved in the operation of said apparatus.

11. The operator identifying apparatus according to claim 10, wherein said oscillator array includes a first oscillator for outputting said first identifying signal and a second oscillator for outputting said second identifying signal, and
said second oscillator is connected to said second electrode during said second period, and wherein
said operator identifying apparatus further includes a switch for connecting said first electrode to said first oscillator during said first period, and for connecting said first electrode to said second detector during said second period.

12. The operator identifying apparatus according to claim 10, wherein said oscillator array includes a first oscillator for outputting said first identifying signal and a second oscillator for outputting said second identifying signal,
said first oscillator is connected to said first electrode, said first oscillator being controlled not to output said first identifying signal during said second period,
said second oscillator is connected to said second electrode, and wherein
said operator identifying apparatus further includes a fourth electrode, connected to said second detector, for transferring said second identifying signal passed through said second operator and said first operator to said second detector.

13. The operator identifying apparatus according to claim 10, further comprising:
a switch for connecting said oscillator array to said first electrode during said first period, and for connecting said oscillator array to said second electrode during said second period; and,
a fourth electrode, connected to said second detector, for transferring said second identifying signal passed through said second operator and said first operator to said second detector.

14. The operator identifying apparatus according to claim 10, further comprising a switch for connecting said oscillator array to said first electrode during said first period, and for connecting said oscillator array to said second electrode and said first electrode to said second detector during said second period.

15. The operator identifying apparatus according to claim 10, wherein when said first detector did not detect said first identifying signal during said first period, and when, during said second period, said first detector detected said second identifying signal but said second detector did not detect said second identifying signal, the controller determines that said second operator has operated said operation unit.

16. An operator identifying apparatus for identifying an operator that has operated an apparatus having an operation unit, comprising:
a first oscillator for outputting a first identifying signal oscillating with a prescribed frequency;

a first electrode connected to said first oscillator and disposed so as to be able to transfer said first identifying signal to a first operator;

a second oscillator for outputting a second identifying signal that is identical in frequency and amplitude to said first identifying signal but is inverted in phase with respect to said first identifying signal;

a second electrode connected to said second oscillator and disposed so as to be able to transfer said second identifying signal to a second operator;

a detector for detecting said first identifying signal or said second identifying signal;

a third electrode, disposed on said operation unit and connected to said detector, for transferring said first identifying signal or said second identifying signal to said detector when said first operator or said second operator touches said operation unit; and, a controller connected to said detector, wherein when said detector detected said first identifying signal, said controller determines that said first operator has operated said operation unit, and when said detector detected neither said first identifying signal nor said second identifying signal, said controller determines that both of said first operator and said second operator are involved in the operation of said apparatus.

17. The operator identifying apparatus according to claim 16, wherein said controller determines that said first identifying signal has been detected when the signal detected by said detector is identical in phase to said first identifying signal, but determines that said second identifying signal has been detected when the signal detected by said detector is identical in phase to said second identifying signal.

18. The operator identifying apparatus according to claim 16, wherein said controller determines that neither said first identifying signal nor said second identifying signal has been detected when a maximum amplitude of the signal detected by said detector is smaller than an amplitude of a signal produced by combining said first identifying signal and said second identifying signal.

19. The operator identifying apparatus according to claim 16, wherein when said detector detected said second identifying signal, said controller determines that said second operator has operated said operation unit.

20. An operator identifying method for identifying an operator that has operated an apparatus having an operation unit, comprising the steps of:

in a first period, supplying a first identifying signal produced by a first oscillator to a first electrode disposed so as to be able to transfer said first identifying signal to a first operator, and supplying a second identifying signal produced by a second oscillator and having a characteristic different from said first identifying signal to a second electrode disposed so as to be able to transfer said second identifying signal to a second operator;

in said first period, detecting by said detector said first identifying signal or said second identifying signal transferred thereto via a third electrode disposed on said operation unit when said operation unit is touched by said first operator or said second operator;

in a second period different from said first period, supplying said first identifying signal from said first oscillator to said first electrode, and detecting by said detector said first identifying signal transferred thereto by passing through said first operator and said second operator;

determining that both of said first operator and said second operator are involved in the operation of said apparatus when said detector detected said first identifying signal during said second period; and, determining that said first operator has operated said operation unit when said detector did not detect said first identifying signal during said second period but detected said first identifying signal during said first period.

\* \* \* \* \*

UNITED STATES PATENT AND TRADEMARK OFFICE
CERTIFICATE OF CORRECTION

PATENT NO. : 8,410,794 B2
APPLICATION NO. : 12/995371
DATED : April 2, 2013
INVENTOR(S) : Tasuku Nakayama Page 1 of 1

It is certified that error appears in the above-identified patent and that said Letters Patent is hereby corrected as shown below:

In the Specification

Col. 29, line 1
Delete "$Th_o$" and insert -- $Th_c$, --.

Signed and Sealed this
Twenty-fifth Day of June, 2013

Teresa Stanek Rea
*Acting Director of the United States Patent and Trademark Office*